United States Patent
Murray et al.

(10) Patent No.: US 11,541,844 B2
(45) Date of Patent: Jan. 3, 2023

(54) SYSTEMS AND METHODS FOR PROTECTING PROPERTY

(71) Applicant: Ford Global Technologies, LLC, Dearborn, MI (US)

(72) Inventors: Andrew J. Murray, Colchester (GB); James Nicholas Murray, Chelmsford (GB); Sam Harris, Billericay (GB); Andy Charalambous, Romford (GB); Edward Ogorman, Belfast (GB); Tarik Safir, Hornchurch (GB); Gabriel Mitchell, London (GB); Aaron Abentheuer, London (GB); Betsy Fields Smith, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 16/780,381

(22) Filed: Feb. 3, 2020

(65) Prior Publication Data

US 2020/0247359 A1 Aug. 6, 2020

(30) Foreign Application Priority Data

Feb. 5, 2019 (GB) .................................. 1901565
Apr. 29, 2019 (GB) .................................. 1905976
Aug. 19, 2019 (GB) .................................. 1911858

(51) Int. Cl.
*B60R 25/31* (2013.01)
*B60R 25/102* (2013.01)
(Continued)

(52) U.S. Cl.
CPC ............ *B60R 25/31* (2013.01); *B60R 25/102* (2013.01); *B60R 25/24* (2013.01); *B60R 25/305* (2013.01);
(Continued)

(58) Field of Classification Search
CPC ............ B60R 25/31; B60R 2025/1016; B60R 2325/205; B60R 25/1001; B60R 25/1009; B60R 25/102; B60R 25/24; B60R 25/25
See application file for complete search history.

(56) References Cited

U.S. PATENT DOCUMENTS 8,731,240 B1 * 5/2014 Woodman ............... F41H 11/00
  382/284
9,747,795 B1 * 8/2017 Espinosa ................ G08B 15/00
(Continued)

FOREIGN PATENT DOCUMENTS

JP  2005092727 A  4/2005
JP  2006117121 A  5/2006
(Continued)

OTHER PUBLICATIONS

European Office Action for EP Application No. 20155488.8 dated May 11, 2022 (7 pages).

*Primary Examiner* — Redhwan K Mawari
(74) *Attorney, Agent, or Firm* — Brandon Hicks; Eversheds Sutherland (US) LLP

(57) ABSTRACT

A method and apparatus for protecting property, wherein the method comprises receiving information indicating an attack on the property, determining, from the received information, a type of attack upon the property indicated by
(Continued)

the received information, and transmitting a data packet to a receiver, the data packet comprising metadata describing the determined type of attack.

15 Claims, 13 Drawing Sheets

(51) Int. Cl.
| | |
|---|---|
| *B60R 25/24* | (2013.01) |
| *B60R 25/30* | (2013.01) |
| *G05D 1/02* | (2020.01) |
| *H04W 4/40* | (2018.01) |
| *G06N 20/00* | (2019.01) |
| *G05D 1/00* | (2006.01) |
| *B60R 25/10* | (2013.01) |

(52) U.S. Cl.
CPC ......... *G05D 1/0011* (2013.01); *G05D 1/0088* (2013.01); *G05D 1/0214* (2013.01); *G05D 1/0276* (2013.01); *G06N 20/00* (2019.01); *H04W 4/40* (2018.02); *B60R 2025/1016* (2013.01); *B60R 2325/101* (2013.01); *B60R 2325/205* (2013.01); *B60R 2325/30* (2013.01); *G05D 2201/0213* (2013.01)

(56) References Cited

U.S. PATENT DOCUMENTS

| | | | |
|---|---|---|---|
| 9,950,685 B1* | 4/2018 | Deyaf | ............... B60R 21/12 |
| 11,214,236 B2* | 1/2022 | Safir | ............... B60R 25/10 |
| 2006/0087411 A1 | 4/2006 | Chang | |
| 2015/0166009 A1 | 6/2015 | Outwater et al. | |
| 2017/0080900 A1 | 3/2017 | Huennekens et al. | |
| 2018/0108369 A1 | 4/2018 | Gross | |
| 2020/0231148 A1* | 7/2020 | Panchangam | ............ G08G 3/02 |
| 2020/0271450 A1* | 8/2020 | Gorur Sheshagiri | ........ G06F 3/0346 |

FOREIGN PATENT DOCUMENTS

| | | | |
|---|---|---|---|
| JP | 2008230457 A | | 10/2008 |
| JP | 2011162052 A | | 8/2011 |
| JP | 2012102510 A | | 5/2012 |
| JP | 2013134589 A | | 7/2013 |
| KR | 20080020732 A | * | 6/2008 |
| KR | 20160056054 A | | 5/2016 |

* cited by examiner

SYSTEMS AND METHODS FOR PROTECTING PROPERTY

CROSS-REFERENCE TO RELATED APPLICATIONS

This disclosure claims priority to and the benefit of GB application No. 1901565.0, filed Feb. 5, 2019, GB application No. 1905976.5, filed Apr. 29, 2019, and GB application No. 1911858.7, filed Aug. 19, 2019, which are all hereby incorporated by reference herein in their entireties.

FIELD

This disclosure relates to methods and apparatuses for protecting property, such as vehicles or structures, by determining a type of attack taking place to the property and particularly, though not exclusively, to disseminating information on the type of attack. This disclosure also relates to a method and system for protection of a vehicle and particularly although not exclusively relates to the use of a sensor which remains active when the vehicle is parked and operates in conjunction with a controller to anticipate a likely attack on the vehicle, and to initiate counter measures.

BACKGROUND

Thieves and other criminals can target property such as vehicles, temporary buildings (for example, cargo containers) and permanent buildings with the aim of gaining entry and stealing any goods from within. In the case of vehicles, the thieves and other criminals may also seek to steal the vehicle itself. There are various ways in which thieves and other criminals may attempt to attack property. For example, in an attack termed "peel and steal", a cargo door of a vehicle is levered away (such as with a crowbar) from the main bodywork and then peeled so as to create an opening through which a thief may access the vehicle. Similar attacks may be perpetrated against temporary buildings such as cargo containers, wherein a door of the container may be prised open to allow access. Equally, doors, windows or shutters of structures may be prised open or otherwise broken to allow illegal (that is, unauthorised) access.

Vehicles and structures can have valuable goods contained therein, such as tools which can be expensive and without which some users cannot work, and therefore protecting property is becoming increasingly important.

Vehicle attacks are performed using means of attack including forced entry with hand tools, lock picking, keyless hacking and, more recently, a technique termed 'peel and steal' in which the top of a door of a vehicle is levered or pulled outwards and downwards, or the bodywork of a vehicle is otherwise peeled open. It is desirable that an attack on a vehicle can be prevented before the vehicle has been damaged.

SUMMARY

According to an aspect of an embodiment there is provided a method for protecting property, the method comprising receiving information indicating an attack on the property, determining, from the received information, a type of attack indicated by the received information, and transmitting a data packet to a receiver, the data packet comprising metadata describing the determined type of attack. The information may indicate that an attack on the property is occurring, that is, the attack is underway as the information is obtained. Alternatively or additionally, the information may indicate that an attack may be imminent, that is, indicators that an attack may be imminent have been detected. An example of information indication an attack that is underway is the detection by an audio sensor of the sound of a window being broken. An example of an indicator that an attack may be imminent is the detection using an image capture apparatus (such as a still camera or video camera) in conjunction with an object recognition system (such as a machine learning system) of a person carrying a tool which may be used to commit an attack, such as a crowbar or bolt cutters.

The metadata may describe at least one of: the time of the attack, the day of the attack, the date of the attack, and the location of the attack.

Therefore, a receiver may receive data that indicates what type and severity of attack is imminent or taking place (for example, and wherein the property is a vehicle, the attacks may comprise speculative tampering, removal of accessories/fluids, forced entry through a door/window or deformative entry through the vehicle bodywork), and/or the location at which that attack is taking place, and/or the time of the attack, and so on. The receiver may be in a user's smart device (e.g. the smart device of an owner, driver, or operator of the vehicle), in the vehicle or structure, or in another vehicle or structure. Therefore, a user may receive information relating to an attack that is taking place or imminent to their property either at their smart device or at their vehicle/structure, or another user, vehicle or structure may receive information that an attack is taking place in a nearby area. As the data may be timestamped, a user may receive, e.g. at the end of each day, e.g. at their smart device or their vehicle/structure, a list of what attacks have taken place in a given area throughout that day. In this way the user may make informed decisions concerning security (e.g. where to park a vehicle, whether to deadlock the vehicle, whether to have security guards patrol a structure etc.); essentially the information allows a user to make a more informed decision regarding the security of their property.

The method may comprise determining if there are any users and/or properties within a predetermined distance of the location of the attack, and transmitting an alert signal to those users or properties. The signal may comprise the data packet and/or the metadata. The signal may be received according to a set of preferences of the user and/or the property, that is, a receiver that receives an alert signal may be configured to accept or reject the alert signal. For example, a vehicle controller may be configured (e.g. by a user) to receive information concerning all attacks being performed on the same (or similar) type of vehicle, or in a specific postcode etc.

A second vehicle or structure may therefore comprise the receiver, a user's smart device may comprise the receiver, or the receiver may be located elsewhere (for example, a central server, as discussed below). In examples where the second vehicle comprises the receiver, the data packet may comprises instructions to cause a controller of the second vehicle to send an alert signal to (a part of) the second vehicle or to a user of the second vehicle. The alert signal may comprise the metadata describing the attack, in other words the alert signal may comprise the data packet. The alert signal, or data packet, may comprise instructions to cause the second vehicle to enter into a high security mode. In other words, the alert signal or the data packet may comprise machine-readable instructions which, when executed by a processor (e.g. a processor in a controller of a vehicle) cause the processor (and therefore the vehicle) to perform at least one task. The task may be a "further action". That further action may be one or more of: transmit the data packet to another vehicle, transmit the data packet to another user, enter a high security mode, change location under autonomous control (e.g. drive away in the case of a road vehicle, sail away in the case of a water vehicle), alert (e.g. send an alert signal to) all users and/or vehicles in a predetermined radius or distance of the vehicle's location, alert a local authority (such as the police), and store the data in a (local or central) database. Therefore, on receipt of the data packet or alert signal the second vehicle may automatically send a signal to a user of that vehicle (e.g. the owner or operator) and/or another vehicle (and/or a user thereof) and/or may enter a high security mode (in which, as will be explained below, at least one sensor may be left on). Therefore the method may comprise transmitting an alert signal to a user of a further vehicle (either directly or via the second vehicle), or to the further vehicle itself. In other words, in this example a data packet containing the metadata is sent from one vehicle to a second vehicle and may cause the second vehicle to take a further action.

The method may comprise determining, at the second vehicle, if there are any users within a predetermined distance (e.g. a first distance) of the location of the second vehicle and, if there are, then transmitting an alert signal to those users within that distance. The method may also comprise determining at the second vehicle if there are any other vehicles within a predetermined distance (e.g. a first distance) of the location of the second vehicle and transmitting an alert signal.

In this way, a vehicle being attacked may send a signal to other users and/or other vehicles, which may then send a signal to further users and/or vehicles. For example, the signal may be sent to a second vehicle which may then send the signal to a third vehicle etc. In this way, a signal indicative of the attack to the first vehicle may be transmitted across a network of users and/or vehicles. The signal may contain the data packet (e.g. the metadata) and may therefore be to inform other users or vehicles of the attack taking place to the first vehicle, or the signal may comprise instructions to cause any vehicle at which the signal is received (e.g. at a controller thereof) to perform a further action (e.g. as described above, entering a high security mode, driving away, etc.).

Analogously to the case wherein the receiver is located in a vehicle, the receiver may be located in a structure, such as a building or a storage unit (such as a shipping container), or in the smart device of a user responsible for the structure (owner, manager, etc.). In examples where a second structure comprises the receiver, the data packet may comprises instructions to cause a controller forming part of the second structure to send an alert signal to (a part of) the second structure or to a user of the second structure. The alert signal may comprise the metadata describing the attack, in other words the alert signal may comprise the data packet.

The alert signal, or data packet, may comprise instructions to cause the second structure to enter into a high security mode. In other words, the alert signal or the data packet may comprise machine-readable instructions which, when executed by a processor (e.g. a processor in a controller of the structure) cause the processor (and therefore the structure) to perform at least one task. The task may be a "further action". That further action may be one or more of: sending an alert signal to a user of the second structure; sending the data packet to one or more further structures; enter a high security mode; alert a local authority; alert all users and/or structures within a predetermined radius; and store at least a portion of the metadata from the data packet in a database. Therefore, on receipt of the data packet or alert signal the second structure may automatically send a signal to a user of that structure (e.g. an owner or manager) and/or another structure (and/or a user thereof) and/or may enter a high security mode (in which, as will be explained below, at least one sensor may be left on and additional security measures may be activated). Therefore the method may comprise transmitting an alert signal to a user of a further structure (either directly or via a further structure), or to the further structure itself. In other words, in this example a data packet containing the metadata is sent from one structure upon which an attack or imminent attack has been detected to a second structure and may cause the second structure to take a further action.

As in the case wherein the receiver is located in a vehicle (as discussed above), the method may comprise determining, at the second structure, if there are any users within a predetermined distance (e.g. a first distance) of the location of the second structure and, if there are, then transmitting an alert signal to those users within that distance. The method may also comprise determining at the second structure if there are any other structures within a predetermined distance (e.g. a first distance) of the location of the second structure and transmitting an alert signal.

In this way, a structure where an attack is underway or may be imminent may send a signal to other users and/or other structures, which may then send a signal to further users and/or structures. For example, the signal may be sent to a second structure which may then send the signal to a third structure etc. In this way, a signal indicative of the attack to the first structure may be transmitted across a network of users and/or structure. The signal may contain the data packet (e.g. the metadata) and may therefore be to inform other users or vehicles of the attack at the first structure, or the signal may comprise instructions to cause any structure at which the signal is received (e.g. at a controller thereof) to perform a further action as defined above.

In another example a central server comprises the receiver, and therefore the method may comprise transmitting the data packet to a central server. The data packet may comprise instructions to cause the central server to transmit an alert, or the data packet, to a user and/or another vehicle/structure. In other words, the data packet may comprise machine-readable instructions which, when executed by the central server causes the central server to perform at least one task. The task may be to transmit an alert (which may comprise the data packet and/or the metadata) to another user and/or another vehicle/structure. In other words, in some examples the method may comprise sending a signal to another vehicle or structure directly (as hereinbefore described) or indirectly via a central server. The method may further comprise transmitting (e.g. via the server) an alert and/or the data packet to another user and/or another property so that the other user or other property may receive either a warning signal indicating that an attack has occurred, or may receive data containing the details of that attack.

As above, this may be done according to whether they are users or vehicles/structures in a predetermined distance of the attack location or may be done according to user-settable preferences. For example, the method may comprise determining, at the central server, if there are any vehicles or structures within a pre-determined distance of the location of the attack and, if there are, then transmitting an alert signal to those vehicles or structures within the pre-determined distance. The method may comprise determining from the metadata whether there is a match between at least part of the metadata and a user-settable preference, and if there is a match, transmitting the alert signal to the user and/or the vehicle/structure containing the preference. In this way, the level of the alerts may be tailored so that a user is not troubled by irrelevant alerts, but still receives information relevant to that user.

The alert signal may comprise machine-readable instructions that, when executed by a controller of a vehicle or structure, may cause entry into a high security mode. The central server may only transmit the alert signal to users and/or vehicles/structures within a predetermined distance (e.g. a second distance) from the location of the indicated attack. The alert signal may comprise machine-readable instructions that, when executed by a controller of a vehicle, may cause each vehicle to move from its current location under autonomous control. The alert signal may further comprise machine-readable instructions that, when executed by a controller of a property (vehicle/structure), may cause the controller to transmit a signal to a user of that property and/or another property. The alert signal may comprise machine-readable instructions that, when executed by a controller (or a processor thereof), cause the controller to check whether the alert signal comprises metadata that match a user-settable preference of a user or another property and if there is a match to transmit a signal (e.g. the alert signal or a different signal) to the user or other property whose preference was a match. The alert signal or different signal transmitted to another property may contain the same instructions such that each property, on receipt of the signal, transmits an alert to a further property (if there is a match) and so each property in a network may be alerted according to their set preferences.

Therefore, according to a method described herein, a vehicle being attacked may transmit a data packet to a receiver containing metadata describing at least one aspect of the attack. In one example, the receiver is part of another vehicle (e.g. a controller thereof). In one example the receiver is part of a smart device. In one example the receiver is part of the vehicle being attacked. In examples where the receiver if part of a smart device the method therefore comprises transmitting a data packet to a smart device. In this way the owner of the smart device, who may be an operator or owner of the vehicle, may be sent the information on the attack taking place to their vehicle. In these examples the method may further comprise determining if at least one aspect of the metadata describing the attack matches a user-settable preference (e.g. the type of vehicle is the same, the attack type is the same, the location is the same etc.) and, if there is a match, sending the data packet to the smart device(s) of those user/users whose preferences match, or to other vehicles whose preferences match. In examples where the receiver is part of another vehicle (either the vehicle being attacked or another vehicle) then the method comprises transmitting the data packet to the vehicle or to the other vehicle. In these examples the data packet may comprise machine-readable instructions that, when executed, by a controller of the vehicle (or a processor thereof) causes the controller to perform a task. The task may be at least one of: transmit the data packet to another vehicle, transmit the data packet to another user, enter a high security mode, drive away under autonomous control, alert (e.g. send an alert signal to) all users and/or vehicles in a predetermined radius or distance of the vehicle's location, alert a local authority (such as the police), and store the data in a (local or central) database. The instructions, when executed, by vehicle the controller may also cause the controller to determine if at least one aspect of the metadata describing the attack matches a user-settable preference (e.g. the type of vehicle is the same, the attack type is the same, the location is the same etc.) and, if there is a match, sending the data packet to the smart device(s) of those user/users whose preferences match, or to other vehicles whose preferences match.

In another example the received may be part of a central server and therefore the method may comprise transmitting the data packet to a central server. In this example the method may comprise transmitting an alert signal to other users and/or vehicles. In other words, the data packet may comprise instructions that, when executed by the central server (or a processor thereof), cause the central server to transmit an alert signal to other users and/or vehicles. The alert signal may comprise the data packet, or the metadata. The instructions, when executed, may be to cause the central server to determine if at least one aspect of the metadata describing the attack matches a user-settable preference (e.g. the type of vehicle is the same, the attack type is the same, the location is the same etc.) and, if there is a match, sending the data packet to the smart device(s) of those user/users whose preferences match, or to other vehicles whose preferences match. In examples where the central server transmits a signal to another vehicle, the alert signal may comprise instructions that, when executed by a controller of the other vehicle, cause that vehicle to perform at least one of: transmit the data packet to another vehicle, transmit the data packet to another user, enter a high security mode, drive away under autonomous control, alert (e.g. send an alert signal to) all users and/or vehicles in a predetermined radius or distance of the vehicle's location, alert a local authority (such as the police), and store the data in a (local or central) database.

Therefore, a vehicle or structure being attacked may upload information concerning that attack to a central server which may instruct (e.g. send a signal to) other vehicles or structures to take further action, which may be autonomously changing location (in the case of a vehicle) or placing themselves in a high security mode. In this way, other properties may prepare themselves for an attack even though users of the properties may not be present.

In another example the central server may, additionally or alternatively, inform other users, e.g. those within a predetermined distance of the attack location. For example, the method may comprise determining, at the central server, if there are any users within a predetermined distance (e.g. a third distance) of the location of the attack and, if there are, then transmitting an alert signal to those users within the predetermined distance.

In another example there may be provided an apparatus for protecting property comprising a first receiver configured to receive information indicating an attack on the property, a processor configured to determine, from the received information, the type of attack that is indicated by the information, and a transmitter configured to transmit a data packet to a second receiver, the data packet comprising metadata describing the determined type of attack. The apparatus may utilise sensors of the property, for example, microphones present in a vehicle or motion detectors in a structure, or the apparatus may comprise one or more sensors configured to detect information indicating an attack on the property, and to send the detected information to the first receiver. The apparatus may also link into a vehicle or structure power supply, or may further comprise a power source (such as a battery, a solar cell, and so on) configured to provide power to the apparatus. Where the apparatus includes one or more sensors and a power supply, the apparatus may therefore operate without interaction with sensors and/or power sources already present in or on the property. The apparatus may further comprise an attachment portion configured to reversibly attach the apparatus on or in the property. A vehicle or structure may comprise the apparatus. The vehicle may comprise a controller (which may comprise the first receiver) and may be configured to receive a data packet. The data packet may comprise instructions such that the controller, on receipt of the data packet, causes the vehicle to perform at least one of: transmit the data packet to another vehicle, transmit the data packet to another user, enter a high security mode, drive away under autonomous control, alert (e.g. send an alert signal to) all users and/or vehicles in a predetermined radius or distance of the vehicle's location, alert a local authority (such as the police), and store the data in a (local or central) database.

A peel and steal attack can take from 60 to 300 seconds. During this time the attackers are working hard, sweating, breathing heavily and shedding detritus.

According to a further aspect of the present invention, there is provided a method of determining the identify of a person attacking and/or stealing from property such as a vehicle, the apparatus comprising capturing material shed by the person, and examining the material to determine the identity of the person/attacker. This method may be used in any other method described herein.

The material may comprise detritus shed by the attacker. The detritus may comprise small pieces of material such as pieces of clothing, one or more clothing fibres, one or more hair fibres, liquids, gases, vapours, biological material comprising one or more of alive or dead prokaryotic or eukaryotic cells, particularly skin cells, dandruff, microbes including bacteria, fungal cells, protoplasts, nucleotides, nucleic acids, DNA, mitochondrial DNA, RNA, tRNA, mRNA, snRNA, rRNA, lipids, proteins and combinations thereof.

The method may comprise contacting one or more of a gas, fluid, air, liquid or vapour with the attacker. For example air or water may be blown onto the attacker to actively remove detritus from the attacker.

The method may comprise contacting the attacker with beads to increase detritus capture. Particles may be one or more of beads, polystyrene beads, particles, microparticles, nanoparticles, tubes, or nanotubes. Particles may have surfaces that can removeably attach to clothing or skin or hairs. Particles may be degradable or dissolvable, for example the carrier may comprise enzyme substrates like proteins and peptides or dissolve in a liquid. The particles may be magnetic. Particles may also transmit location and detritus related data to a remote data receiver.

Collection and trapping of detritus from an attacker can improve attacker identification reliability and resolution.

Detritus filters are known in the art, e.g. Dyson or household vacuum filters are of sufficiently fine porosity to capture the relevant material and also allow air to travel through without excessive resistance.

A means for collecting detritus from an attacker is to use a detritus trap.

According to a further aspect of the present invention, there is provided an apparatus for capturing material shed by a person (the attacker) attacking and/or stealing from property such as a vehicle, the apparatus comprising a shed material capture device. The shed material capture device may capture and/or store detritus from the attacker for later examination, for example by an enforcement agency. The material capture device may be used in any of the arrangements described above.

Detritus may be collected by the material capture device by one or more of gravity, suction or magnetism. The material capture device may itself be at least partially magnetic.

The material capture device may comprise a detritus trap, which may be located on or behind the internal and/or external surface of the property. The detritus trap may have a first closed configuration when not in use, a first open configuration when an attack has been detected or predicted, and a second closed configuration after detritus has been collected. Detritus collection may be confirmed by changes in detritus trap properties, these properties may be one or more of weight, conductivity, stability, vibration, surface reflectivity, resonance and position.

The detritus trap may comprise one or more filters comprising a pore size of 0.1 micron to 0.9 micron. For example the detritus trap may have a first filter with a pore size of between 0.9 to 0.7 microns and a second filter adjacent to the first filter of between 0.1 to 0.5 microns to collect finer detritus.

The detritus trap may be cooled while not in use or immediately after use and may also comprise detritus preservation substances.

Preservation substances may be introduced to the detritus trap after detritus has been received. Preservation substances may for example comprise one or more of sterile water, sterilising agents, liquid anti-infectives, ethanol, low pH liquid, acidic buffer, methanol, formaldehyde and liquid gases especially liquid nitrogen.

The detritus trap may be securely stored and sealed from the environment after it has been in operation during an attack. The stored detritus may be removed for laboratory analysis. The analysis may for example be one or more of physical, chemical, biochemical, biological or microscopic analysis.

The detritus trap may deliver detritus to an analytical device. The analytical device comprises one or more detectors capable of providing one or more of chemical, biological, gas, vapour and nucleic acid profiles from detritus. The detritus trap may have means to remove identifying material from a particle, for example using acid, alkali or enzymes.

The detector may comprise an optical detector that detects at least one property selected from the group comprising an absorbance, transmission, scattering, fluorescence, fluorescence resonance energy transfer, surface plasmon resonance, surface enhanced Raman scattering, diffraction, and a combination thereof. The detector may also comprise biomarker binding moieties, electrophoretic processes, Polymerase Chain Reaction chambers, Nucleic acid sequencers, next generation nucleotide sequencers, nanopore sequencers for non-cloned DNA. The detector may be located on a particle.

Detector generated data (i.e. detector data) may be in digital format and stored in a local or central database for analysis. The detector data may be included in the datapacket. Analysis of the detector data may be carried out by enforcement agencies such as police services or other suitable government agencies or commercial service companies. The detector data may be matched with other data held in a database.

As the detector data may be used to identify an attacker or help develop a profile of an as yet unidentified attacker, the detector data can form part of the metadata. The detector data may be used as an attack signature by identifying a person inside or outside the property or match the detector data with an as yet unidentified attacker.

Access to the detector data may be secured by blockchain authentication means. Detector data may be purchasable from the property owner. Detector data may be purchased using block chain processes.

According to an arrangement, there is provided a method for protection of a vehicle, the method comprising: receiving information from at least one sensor, e.g. at least one type of sensor; comparing the information with one or more known signatures indicative of a likely attack; determining whether a known signature indicative of a likely attack is present; and if a known signature indicative of a likely attack is present, placing at least one system of the vehicle into a heightened state of alert.

The step of placing at least one system of the vehicle into the heightened state of alert may comprise at least one of: activating at least one further sensor, e.g. at least one further type of sensor; sending a notification to a location remote from the vehicle; and performing one or more steps to further secure the vehicle.

The method may additionally comprise: comparing the information with one or more known attack mode signatures; determining whether a known attack mode signature is present; and if a known attack mode signature is present, activating an additional vehicle system and configuring it to counter an attack having the known attack mode signature.

The method may additionally comprise: comparing the information with one or more known intruder signatures; determining whether a known intruder signature is present; and if a known intruder signature is present, activating an additional vehicle system and configuring it to repel an intruder.

The method may further comprises at least one of: transmitting at least one live sensor output to a remote location; recording at least one sensor output; performing an action to draw attention to the vehicle; and performing an action to counter the attack.

The sensor may be fitted within the vehicle, or may be fitted to the exterior of the vehicle.

The sensor may run continuously, at least whilst the vehicle is unattended. Alternatively, the sensor may be switched on at regular and/or frequent intervals whilst the vehicle is unattended, in order to conserve battery power.

Machine learning may be used to learn at least one of: signatures indicative of a likely attack; attack mode signatures; intruder signatures; and signatures of authorised persons, such as regular passengers in the vehicle.

Where the vehicle is an autonomous or semi-autonomous vehicle, the method may comprise the step of the vehicle driving away from the environment. For example, the vehicle might be configured to drive away if a controller associated with the vehicle determines that at least one of the following is present: a known signature indicative of a likely attack; and a known attack mode signature.

The vehicle may be provided with at least one of the following types of sensors: an audio sensor, a motion sensor, a radio frequency sensor, an accelerometer, a vibration sensor, a passive infrared sensor, a Bluetooth sensor and a camera.

The method may additionally comprise: comparing the information with one or more known signatures of authorised people, determining if a known signature of an authorised person is present; and if a known signature of an authorised person is present, allowing the authorised person access to the vehicle.

The method may further comprise the step of sending to the vehicle an instruction to treat a new person not known to the vehicle as an authorised person.

The step of sending to the vehicle an instruction comprises sending a message to the vehicle from a mobile device of a vehicle user who already has authority to use the vehicle.

The method may further comprises the step of downloading onto a mobile device of the vehicle user electronic identity data of the new person, the identity data then being sent to the vehicle by the vehicle user so that the vehicle can recognise the new person by the identity data.

The identity data of the new person may be an electronic signature of their mobile device. For example, it may comprise a Bluetooth identity of the new person's smart phone.

According to another arrangement, there is provided a system configured to perform the method of any preceding claim, the system comprising: at least one sensor configured to gather information relating to the environment of the vehicle; and a controller, configured to be in communication with the sensor.

According to another arrangement, there is provided a method of controlling a security system, the method comprising: sending to the security system an authorised electronic identity of a new authorised user of the security system from a central server and/or a mobile device of a user who already has authority to use the security system; recording the electronic identity of a person approaching the security system and comparing it with the authorised electronic identities stored by the security system, determining if an authorised electronic identity is present, and if so, that the person approaching is a new authorised user; and disabling the security system sufficiently to allow the new authorised user access. The authorised electronic identity may comprise the Bluetooth signature of the new authorised user's mobile device, such as a smart phone or tablet. The security system may be a vehicle security system.

The step of recording the electronic identity of a person approaching the security system may comprise using existing or dedicated sensors on the vehicle to read the electronic identity of the person approaching the vehicle.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

DESCRIPTION OF FIGURES

For a better understanding of the present disclosure, and to illustrate how certain examples may be put into effect, examples will now be described with reference to the accompanying drawings in which.

DETAILED DESCRIPTION

Figure 1:
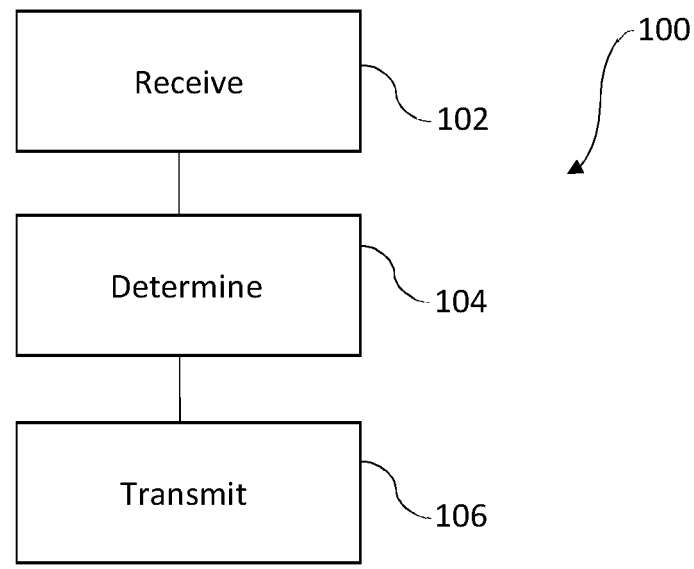
FIG. 1 is a flowchart of an example method.

FIG. 1 shows an example method 100 of protecting property, such as a vehicle or structure, which may be performed by an apparatus for protecting property. The method comprises, at step 102, receiving information that indicates an attack on the property. At step 104 the method comprises determining, from the received information, the type of attack indicated. At step 106 the method comprises transmitting a data packet to a receiver. The data packet comprises metadata describing the type of attack (determined at step 104).

Step 102 may comprise monitoring, e.g. via a sensor or a vehicle control module (or controller) comprising the sensor, a key signal to determine if an attack on the vehicle has been initiated and/or is likely to be initiated and/or if someone is tampering with the vehicle. The information indicating an attack may indicate that an attack is underway as the information is obtained, that is, the attack is occurring. Alternatively or additionally, the information may indicate that an attack may be imminent, that is, indicators that an attack may be imminent have been detected. Alternatively or additionally, the information may indicate that an attack has been perpetrated (that is, the attack is finished). An example of information that an attack is imminent could be detection using an image capture apparatus (such as a still camera or video camera) in conjunction with a machine learning system of a person carrying a tool which may be used to commit an attack, such as a crowbar or bolt cutters. A further example of information that an attack is imminent could be information indicating tampering, for example someone trying door handles to determine whether a vehicle or property is left unlocked, or trying to enter the vehicle or property, or steal part of the vehicle etc. An example of information indicating an attack that is underway could be the detection by an audio sensor of the sound of a window being broken, or a motion detector within a vehicle or property being triggered. An example of information indicating that an attack has finished could be the doors or windows of a structure or vehicle being left ajar, as may be detected using image capture means as referred to above. As will be appreciated the above examples are illustrative, and other information could additionally or alternatively be used to detect an ongoing or imminent attack.

The information may be received from one or more sensors, and different kinds of sensors may monitor different kinds of inputs, and therefore may be able to sense different types of attacks. The sensors may form part of an apparatus for protecting property, as referred to above. Additionally or alternatively, the sensors may be located within a vehicle or structure and connected by wired or wireless connections to the apparatus.

Examples of the types of sensors which may be used to detect information indicating an attack on the property (either an ongoing attack or imminent attack) include audio sensors, motion sensors, image capture devices (still images and video), thermal sensors, accelerometers or tilt sensors, location sensors, and so on. Where an apparatus receives information from sensors in a vehicle or structure, the information may be received via a controller in the vehicle or structure, or directly from the sensors themselves. The received information representing a likely attack on a vehicle may be a loss of signal from a sensor. Any monitoring, e.g. by a vehicle control module of any signals from a sensor, may be continuous or may be periodic.

At step 104 the method determines whether there is valid suspicious activity. Step 104 may comprise comparing the information received from the one or more sensors to known signatures indicative of a kind of attack, or the loss of a signal from a particular sensor may be indicative of a kind of attack. The determination of whether an attack is underway or imminent may comprise evaluation of information from several different sensors. Different criteria and thresholds may be set for detecting an imminent or ongoing attack, depending on the particular situation in which a method or apparatus in accordance with an aspect of an embodiment is utilised.

At step 106, appropriate action is taken having identified that there is suspicious activity at the property (vehicle or structure). The appropriate action may comprise transmitting a signal to a receiver. The receiver may be at a user of the vehicle or structure (e.g. a smart device of a driver, an owner, a passenger, a manager, etc.), or at a second vehicle or structure, or at a centralised or de-centralised server. Therefore, step 106 may comprise transmitting a signal to one or more of: a user, a second vehicle or structure, and a server. Step 106 may comprise determining whether any one of a user and another vehicle/structure is present within a set distance of the location at which an attack (ongoing or imminent) has been detected and, if so, transmitting the signal to any users or other vehicles/structures within that set distance. The system may be configured to separate signals relating to alarms at structures and at vehicles, for example, vehicle users or vehicles within a set distance of an attack on a vehicle may be sent a signal, but structure users or structures within the set distance may not be sent a signal. Alternatively, the system may not discriminate between structure and vehicle alarms, so (for example) a vehicle within the set distance may receive a signal relating to an attack on a structure.

The transmission in step 106 comprises a data packet containing metadata that describes what kind of attack has taken place or is taking place to the vehicle. As will be explained below, in examples where the data packet is transmitted to a server, the method may comprise the server forwarding an appropriate alert to a user of a vehicle/structure if the user is not at the same location as the vehicle/structure. As will also be explained below, examples of the method 100 may comprise triggering the vehicle/structure, or another vehicle/structure (e.g. a controller or control module in said other vehicle/structure) to place the vehicle/structure into a heightened security mode. In the case of a vehicle with autonomous movement capabilities, the vehicle may also be caused to change location, for example, to drive or sail away from its current location.

The metadata may additionally describe at least one of: the time of the attack, the day of the attack, the date of the attack, and the location of the attack. In other words, the metadata may comprise a timestamp and/or a component representing the location of the attack (e.g. GPS coordinates).

FIGS. 2A to 2E show examples of how a person may be attacking (or attempting to attack) a vehicle, specifically a van, and how each kind of attack may be detected. Several of the different attack types shown in FIGS. 2A to 2E are also applicable to other types of vehicles such as cars, trucks, boats, hovercraft, and so on. The types of attacks may also be applicable to structures, such as buildings (of any construction) or shipping containers.

Figure 2A:
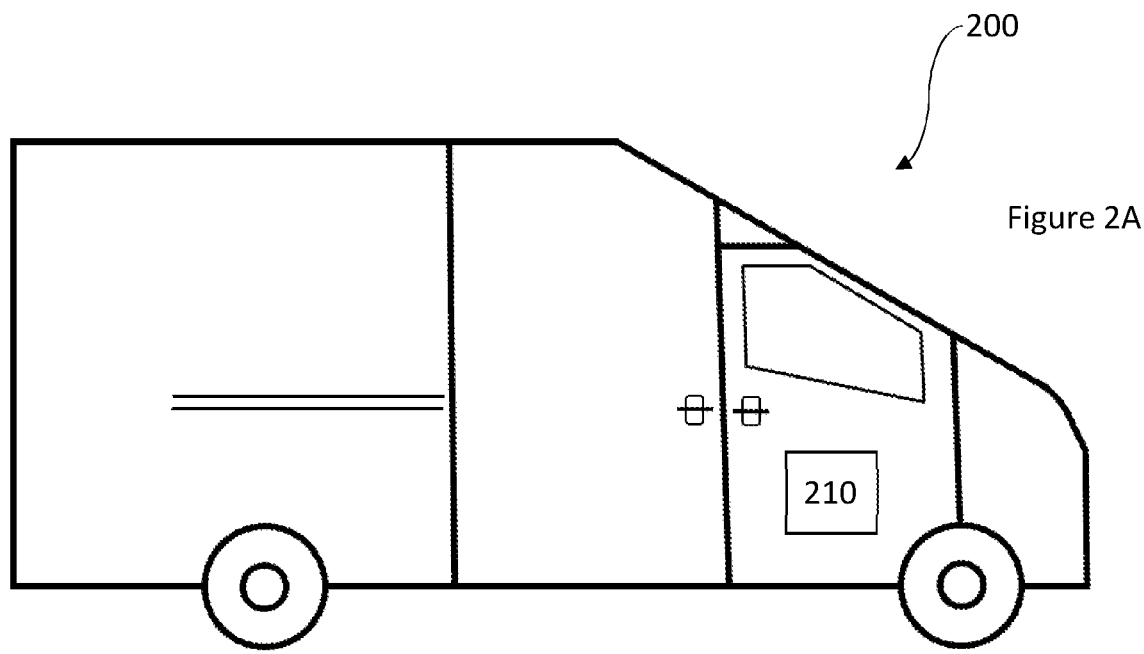
FIGS. 2A to 2E schematically show various types of attacks and sensors for detecting the types of attacks.

FIG. 2A shows a vehicle 200 comprising a sensor (shown schematically at 210). The sensor 210 is capable of detecting if an unauthorised person (without the vehicle's key) is attempting to enter the vehicle. For example, the sensor 210 is configured to detect if a valid key is nearby (e.g. within a predetermined distance of the sensor). Typically, the sensor operates in conjunction with an identifier on or in the key, such as an RFID tag. If the vehicle's door handle is operated when the sensor 210 does not detect the presence of a valid key then this may indicate that an unauthorised person is attempting to enter the vehicle (or is checking whether the vehicle has been left unlocked). In this way, the sensor 210 may send a signal (which may be received at step 102 of the method 100) representing that the door handle is being manipulated without a valid key nearby. This signal may then be interpreted to determine (step 104) that an unauthorised person is attempting to enter the vehicle. In this way, the information transmitted by the sensor 210 is able to be used to determine this particular attack. An equivalent system may be implemented for doors of other vehicles, or doors of structures. It is not necessary for an RFID tag to be used to identify an authorised person; authorised persons could be identified using systems such as signals emitted by smart devices (such as mobile phones), for example, Bluetooth™ signals.

Figure 2B:
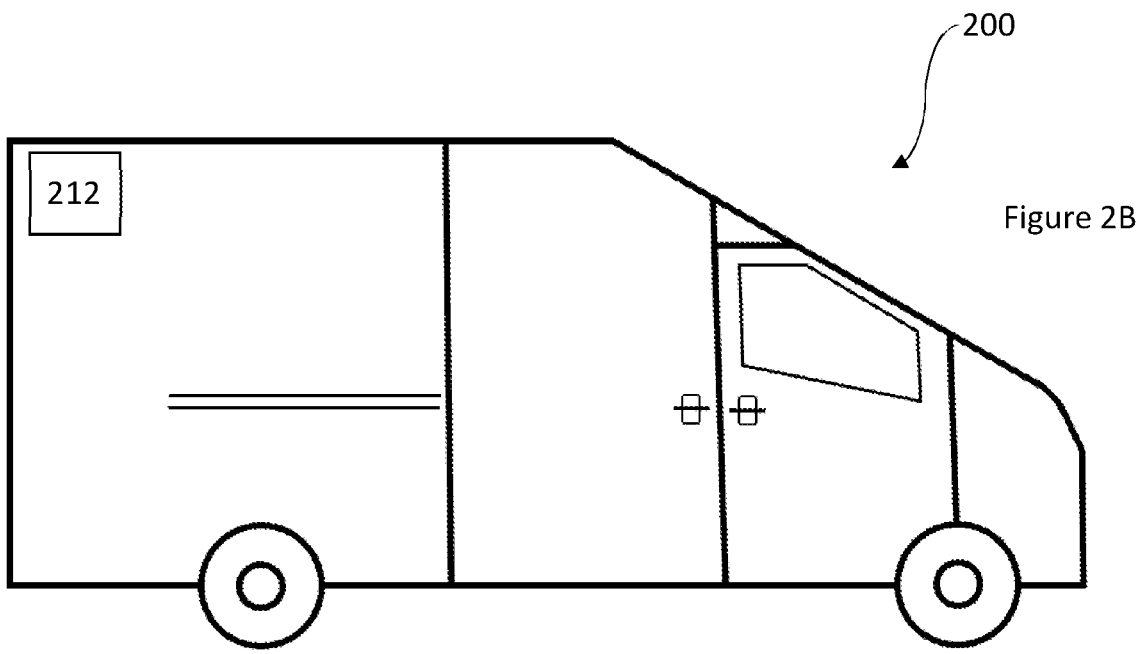

FIG. 2B shows a vehicle 200 comprises a sensor 212 that is disposed in a panel of the vehicle. FIG. 2B shows the sensor being disposed in a side panel (of the load compartment) but in other examples the sensor may be disposed elsewhere (for example in a door or in the roof panel of the vehicle). The sensor 212 in this example may comprise a vibration sensor (such as an ultrasonic sensor), and is configured to sense vibrations in the panel in which it is disposed and to transmit those vibrations (e.g. to a controller of the vehicle). A characteristic of those vibrations may enable the determination of a type of attack on the vehicle. For example, if a person were using an angle grinder to effect entry into the vehicle by cutting its side panel the sensor 212 could detect those vibrations (step 102 of the method 100). Based on these vibrations it may then be determined that a person is attempting entry into the vehicle by cutting the side panel. In another example, if a person had wedged a crowbar between a door frame and an adjacent panel (or had used the crowbar to create a hole in the side panel) and was attempting to peel away the door (an attack known as "peel and steal") then the characteristic of those vibrations may be used to determine that a person was attacking the vehicle in this way. An equivalent system may be implemented in structures, particularly structures such as shipping containers which may not have weak points such as windows but which may be susceptible to attack using tools as described above (for example, to doors or sides of the shipping container).

Figure 2C:
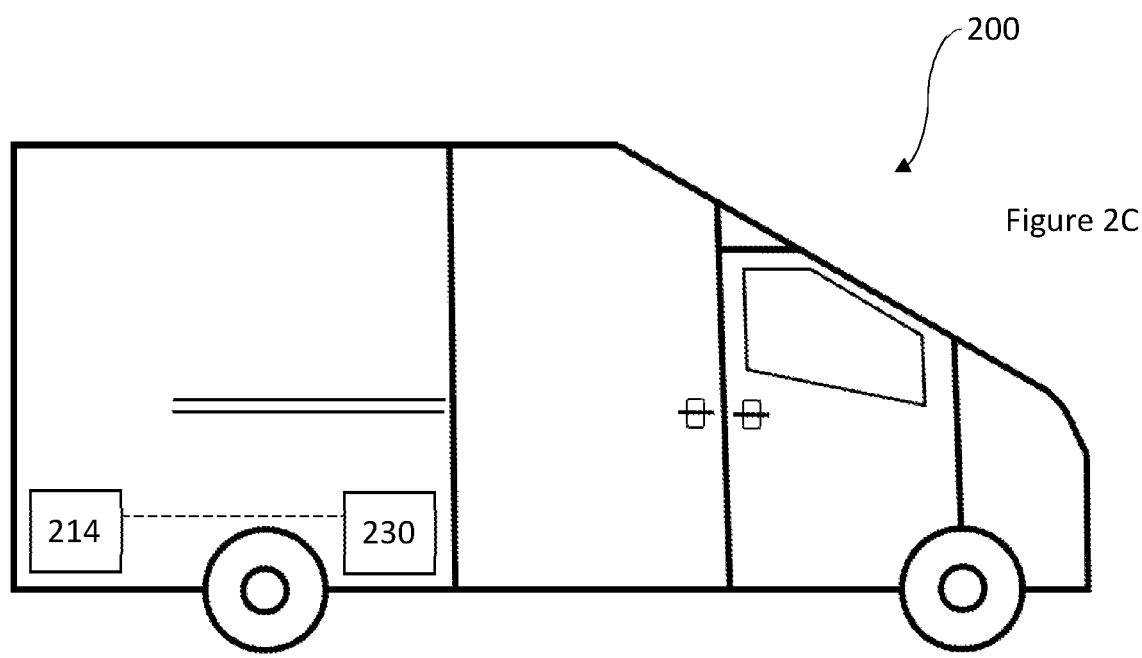

FIG. 2C shows a side panel of a vehicle comprising a trip-circuit 214. The trip-circuit 214 is indicated schematically in a side panel toward the floor of the vehicle. The circuit 214 is a sacrificial circuit and is designed to send a continuous, or semi-continuous (e.g. a pulsed), signal to a vehicle control unit (e.g. a controller), schematically indicated at 230. This signal will be interrupted if the circuit is shorted due to an intruder performing an activity that opens the circuit (e.g. by cutting a wire or the kind of vibrations resulting from deformation to a panel of the vehicle) causing the circuit to trip. That is, the circuit 214 may be operatively connected to a vibration sensor (such as the sensor 212) and may be designed to trip in the event of a sensed vibration whose amplitude is sufficient to indicate a significant compromise in the integrity of the side panel. An equivalent system may be implemented in structures, particularly structures such as shipping containers which may not have weak points such as windows but which may be susceptible to attack using tools as described above (for example, to doors or sides of the shipping container).

Figure 2D:
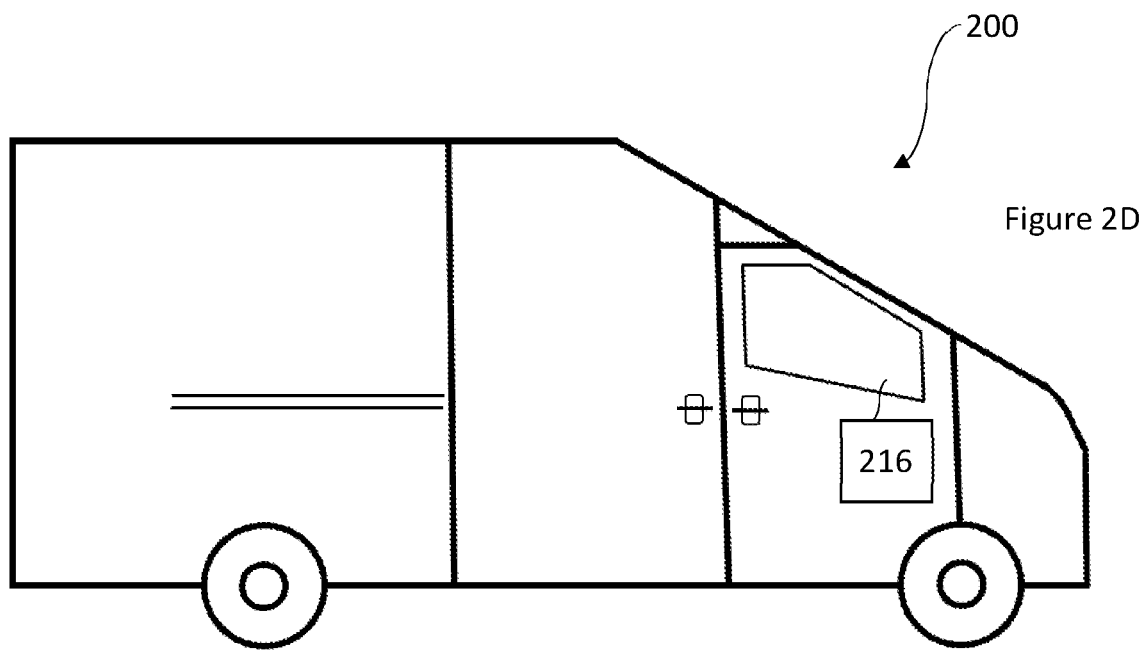

FIG. 2D shows a vehicle 200 comprising a sensor 216 that is disposed on or near a window 202 of the vehicle. The sensor 216 may comprise a vibration sensor (such as an ultrasonic sensor) and is configured to detect a change in the integrity of the window 202. In this way, if the vehicle window were to be broken, the vibrations detected by the sensor 216 may be used to determine that someone has broken the window of the vehicle. In another examples the sensor 216 may comprise a microphone configured to detect the audio signature indicative of a break-in. In this case, the type of audio that characterises a window break, or an attempted entry into the vehicle (e.g. that rattling of a door handle), or the cutting or peeling away of the vehicle's bodywork etc. and therefore the microphone or audio sensor 216 can determine which of these types of attacks is taking place. An equivalent system may be implemented in structures, for example, buildings where windows may be a potential entry point for unauthorised access into the building.

Figure 2E:
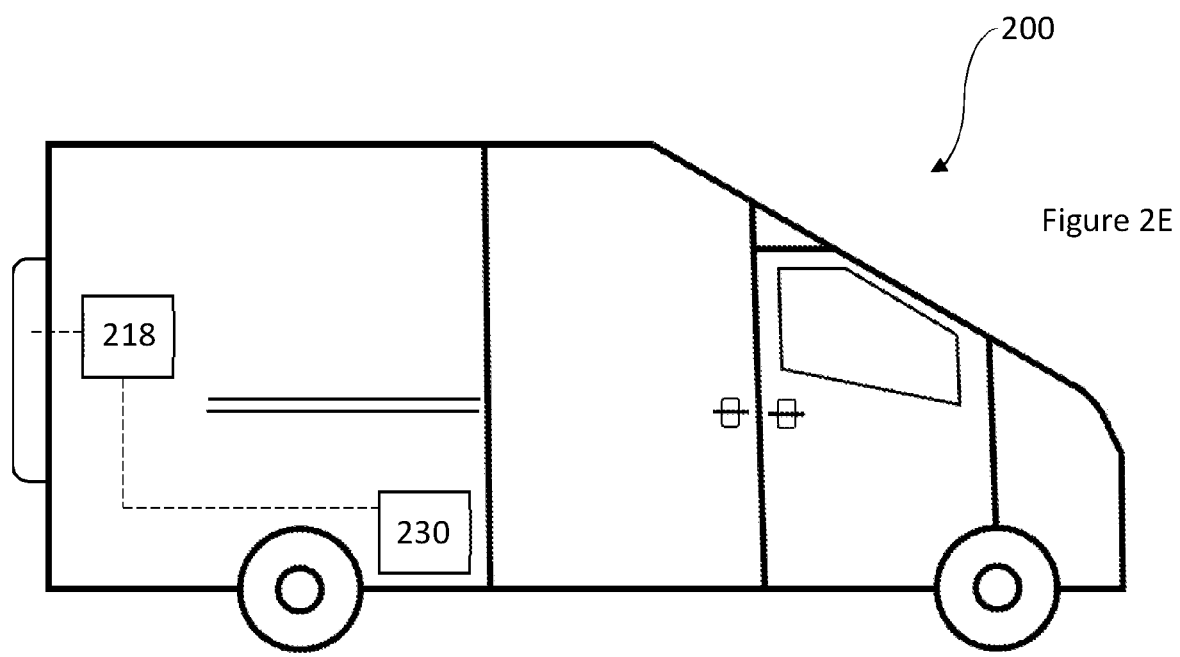

FIG. 2E shows a vehicle 200 comprising a sensor (schematically indicated at 218). This sensor may be operatively connected to a wheel of the vehicle or may be some other sensor. The sensor 218 is operatively connected to a controller 230 and is configured to send its output to the controller 230. In one example the sensor 218 may be a sensor on the spare wheel cradle or connected to the spare wheel cradle and may be configured to detect whether the spare wheel has been removed—thereby indicating theft or attempted theft of the spare wheel—and communicate this to the controller 230. In another example, the sensor 218 may be operatively associated to the vehicle catalytic converter and is operable to detect tampering with, or removal of, the catalytic converter, and to communicate this to the controller 230. In these examples the output of a vehicle sensor 218 to the controller 230 may indicate the type of attack taking place, or that has taken place, to the vehicle. The sensor may be located on any component that is vulnerable to theft; exterior components of boats may be particularly susceptible in this way. The sensor may also be used in the context of a structure to detect tampering with (or removal of) components such as signs from the exterior of a building.

In another example (not shown in the Figures) a vehicle controller may communicate with a fuel gauge that is configured to determine the level of fuel in the vehicle's fuel tank. In this example, a change in the level of the fuel may indicate that a person is syphoning fuel from the vehicle.

In another example the sensor may comprise a sensor of any suitable type for determining a specific type of attack, for example: an accelerometer, motion sensor, temperature sensor, door lock sensor, tilt sensor, microphone, audio sensor, wireless signal detector, GPS device, camera (capable of capturing still images, video, or both) having hardware and software to perform facial or object recognition, Lidar, Radar, ANPR, radio frequency detector, Bluetooth detector, gyroscope, passive infrared (PIR), detector to determine the identity of a smart device (such as a mobile phone), or any combination thereof. It will also be appreciated that a plurality of different sensors may be provided at the vehicle or structure, one, some, or all of which may be used in the method 100 to determine the type of attack taking place on/at the vehicle. It will be appreciated how these various sensors may be used to determine a specific type of attack, for example an audio sensor or microphone may register sound waves characteristic of cutting through a side panel of a vehicle or hitting a side panel, or a window or door of a vehicle or structure; a camera may record the environment external to the a structure and so may visually indicate the type of attack taking place, or may record the interior of a structure and thereby detect the presence of an unauthorised person; a tilt sensor may indicate that a person is attempting to roll a vehicle over or move a shipping container etc. As mentioned above, existing sensors that are already present in a vehicle or structure (for example handsfree microphones and catalyst sensors, cameras, etc.) may be used (e.g. repurposed) in an additional capacity for security monitoring to detect different types of attack and therefore in some examples additional sensors may not be needed. In some examples, additional sensors may be installed either separate from or as part of an apparatus. This may be particularly appropriate where no suitable sensors that may be repurposed are present in the property, for example, a shipping container typically would not comprise image capture devices. Where sensors are provided for use with, or as part of, the apparatus, these sensors may be used in conjunction with any existing sensors (which may send information to the apparatus using wireless or wired connections as discussed above), or the apparatus may utilise only the dedicated sensors. In some aspects of embodiments the apparatus may be contained within a single package or unit, which may therefore comprise receivers, processors and transmitters, sensors, a power source (such as a battery or solar cell), and so on. Aspects of embodiments of the apparatus are discussed in greater detail below.

In a specific example of the method 100 shown in FIG. 1; step 102 (receiving information indicative of an attack on the vehicle) may comprise receiving information from a vibration sensor configured to sense vibrations in a vehicle panel, indicating that vibrations indicative of an attack using an angle grinder have been detected. At step 104 the information may be analysed and the type of attack that is occurring is determined, from the information received at step 102, as an attempted unauthorised entry into the vehicle through a vehicle panel using an angle grinder. Once the type of attack is determined, metadata describing the type of attack is sent to a receiver at another entity (at step 106) in the form of a data packet.

In other instances, step 102 (receiving information indicative of an attack on the vehicle) may comprise receiving information from a sensor (for example a sensor capable of detecting if a person without the vehicle's key is attempting to enter the vehicle, or a vibration sensor configured to sense vibrations in a window and/or a vehicle panel and/or a door, or a fuel gauge or a wheel sensor), or the information may be a loss of signal (e.g. a short circuit or loss of a continuous, or pulsed, signal from a sensor). At step 104 the type of attack that is occurring is determined from the information received at step 102. As above the type of attack may be attempted unauthorised entry into the vehicle (as determined, for example, by information received from the sensor 210), a break-in, e.g. via a crowbar or an angle grinder, to the roof or a side panel or a door of the vehicle (e.g. as determined from information by a sensor 212 or through a short circuit 214), a broken window (e.g. determined via a vibration sensor 216), a wheel theft (e.g. as determined by a loss of signal from a wheel sensor 218), or a syphoning of fuel (e.g. as determined by a signal from a fuel gauge). Once the type of attack is determined, metadata describing the type of attack is sent to another entity (at step 106) in the form of a data packet.

In examples where a sensor is used to send the received information, the sensor may be configured to interface with a central control system, or a controller, of the vehicle, or the system or controller may comprise the sensor.

Figure 3:
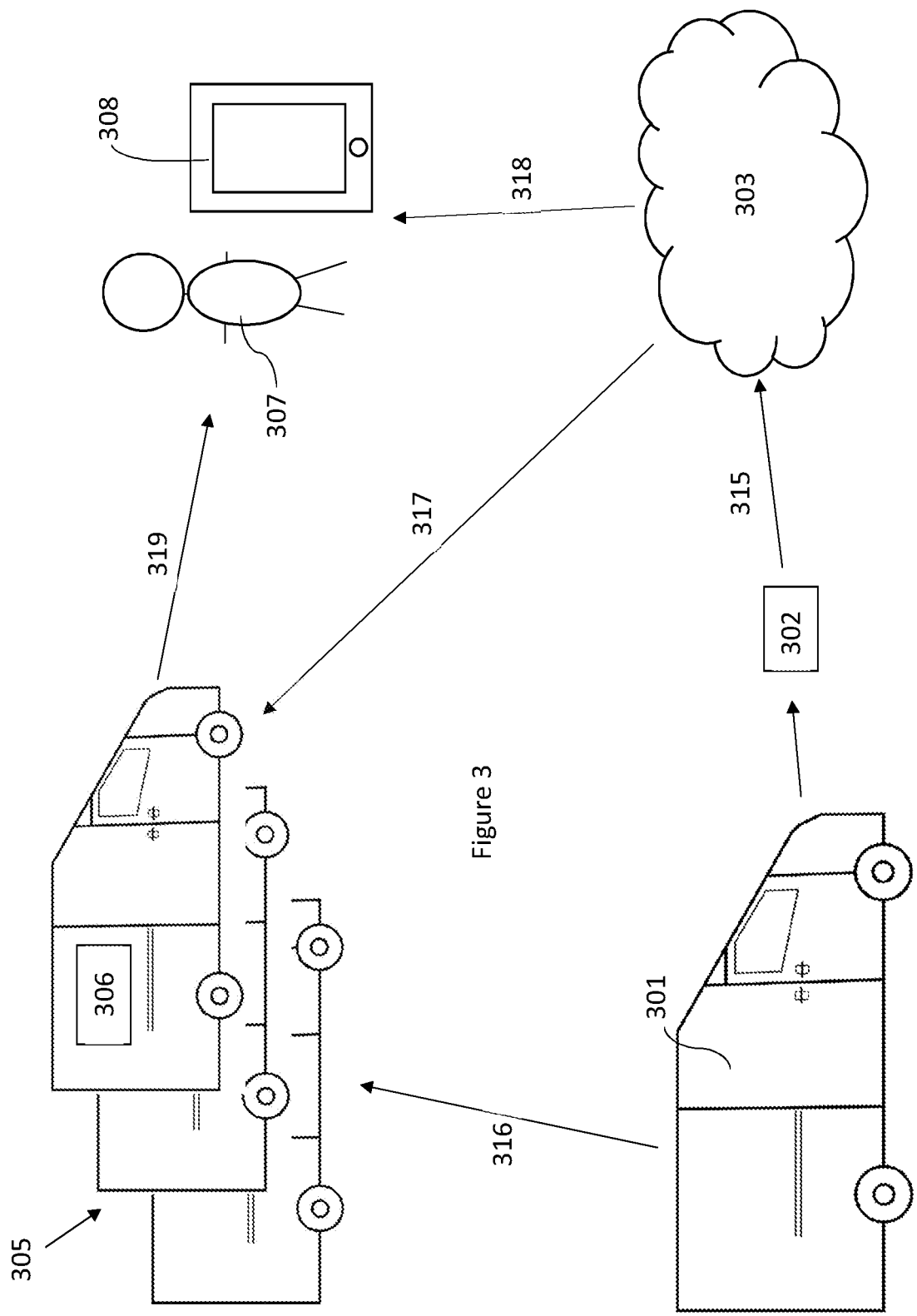
FIGS. 3 and 4 schematically show networks to indicate an example operation of the method of FIG. 1.

FIG. 3 shows schematically how the data packet may be transmitted to various receivers in aspects of embodiments. Some aspects of embodiments shown in FIG. 3 depict the data packet being sent between vehicles; as discussed above the data packet may also be sent between structures, or between structures and vehicles, depending on the specific configuration of a given system.

As shown in FIG. 3 a vehicle 301 is configured to transmit (as indicated by the arrow 315) a data packet 302 to a device, depicted in FIG. 3 as a cloud device 303, or to another vehicle (or vehicles) 305. The vehicle 301 may transmit the data packet 302 (to the cloud device 303 or to another vehicle 305) as part of the implementation of step 106 of the method 100. The data packet 302 comprises metadata describing the type of attack (determined at step 102); additional information may also be included in the metadata such as the time, day, date and/or location of the attack.

When the method 100 comprises, as indicated by the line 316, transmitting the data packet to another vehicle (or vehicles) 305, the controller 306 of another vehicle 305 may send an alert signal (not shown) to a user (also not shown) of that vehicle. In other words, the data packet, transmitted from vehicle 301 to vehicle 305 (via line 316) may comprise instructions that when executed by a controller 306 of the vehicle 305 cause that controller to send an alert signal to a user of that vehicle (line 319). In another example, the method 100 may comprise (line 316) transmitting an alert signal, which may comprise the data packet or may comprise the same metadata of the data packet. In other words, the user receives a signal describing the type of attack occurring to their vehicle, and optionally additionally the location, time, date, and/or day of the attack. The user can then take subsequent action (e.g. return to their vehicle, alert the police etc.). The data packet, or the alert signal, may comprise instructions that when executed by the controller 306 will cause the other vehicle 305 to enter a high security mode. In other words on receipt of the data packet or alert signal a controller 306 of the other vehicle 305 may place it into a high security mode which, as will be described below, may comprise activating a number of vehicle sensors. In one example, the other vehicle 305 (e.g. a controller thereof), on receipt of the data packet or alert signal, may determine if there are any users within a predetermined distance (e.g. a first distance) of that vehicle's location and, if so, transmit an alert signal to all users or other vehicles within that distance. The predetermined distance may be a user-settable, and/or a user changeable, distance, or a predefined distance, e.g. all users within the same postcode in which the other vehicle 305 is located.

Where the instructions from a data packet cause a vehicle or structure to enter a high security mode, this may comprise a variety of different actions. In the case of a vehicle, thresholds for alarm triggering may be altered (typically lowered) so that an alarm may be triggered more easily. For example, the threshold at which an audio sensor linked to an alarm may trigger the alarm could be lowered by 10 dB, so that a comparatively quiet sound which would not trigger the alarm in a normal mode would trigger the alarm in a high security mode. The high security mode could additionally or alternatively comprise activating sensors or systems which would, in a normal mode, remain inactive. Taking the example of a structure comprising video cameras, the cameras in the interior of the structure may be inactive in a normal mode (for example, to save power). When the structure is caused to enter a high security mode, the cameras in the interior may then be fully activated so that images of intruders may potentially be captured.

The property 301 may comprise a controller that decides to which users or other vehicles to send the data packet or alert signal. For example, as will be explained later, the controller may determine if the metadata matches a user settable preference and, if so, transmit the data packet to all users or vehicles whose preferences match the metadata.

As stated above, the data packet may, alternatively or additionally, be transmitted to a central server or database (e.g. the cloud device 303), as indicated by the line 315. In these examples, the data packet may comprise instructions to cause the server to transmit an alert (line 317) to another property 305 (or properties) or to a user 307 (line 318) (e.g. a user's smart device 308). In this example the user 307 may be a user of the other property 305 (e.g. the driver or owner of a vehicle, the owner or manager of a structure, and so on) or a user who has subscribed to the service (this will be explained in more detail below). The data packet, or alert signal, transmitted from the central server 303 to another property 305 (line 317) may comprise instructions to place the vehicle or structure in a high security mode, as discussed above. For example, placing the vehicle in a high security mode may comprise instructions to the vehicle to drive away from its current location, thereby driving way from the attack that is in progress. The alert signal may cause the vehicle 305 to transmit a signal to a user of that vehicle (e.g. a driver or an owner).

The property (vehicle/structure) 301 may comprise a receiver and a controller (the controller may comprise the receiver) such that when the receiver receives the data packet, instructions in that data packet are to cause the controller to place the property 301 in a high-security mode, change location under autonomous control (if the property is a vehicle), transmit a further signal etc.

Figure 4:
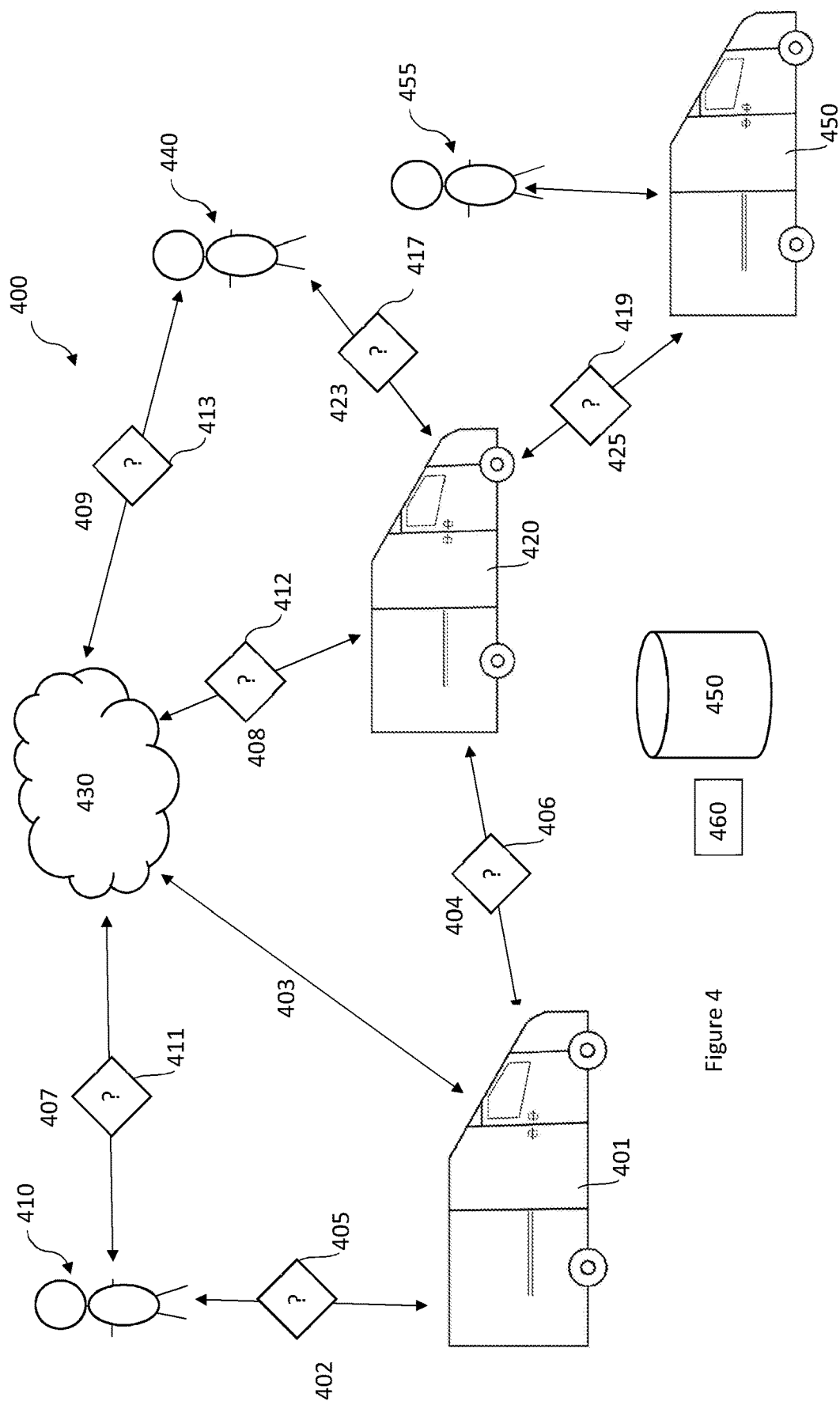

FIG. 4 shows a communications network 400 in accordance with an aspect of an embodiment that may perform the method 100 of FIG. 1. FIG. 4 may be considered to be an extension of FIG. 3. In the aspect of an embodiment shown in FIG. 4, the property is a vehicle (specifically, a van); as will be appreciated other aspects of embodiment may be implemented in other vehicles or structures (that is, other properties). The vehicle 401 as shown in FIG. 4 may perform the steps 102-106 of the method 100. That is, the vehicle 401 may receive information from a sensor (which may form part of the vehicle), determine from the information the type of attack that is occurring to the vehicle or may be imminent, and then transmit a data packet containing metadata describing the type of attack. As indicated by the lines 402, 403 and 404, the data packet may be communicated to at least one of: a user 410 (e.g. a user of the vehicle or any other user), another vehicle or structure 420, or a central database 430 (depicted as a cloud device). As indicated by decision step 405, the vehicle 401 (e.g. a controller thereof) may check whether there are any users 410 within a distance (e.g. a predetermined distance) of the vehicle 401 and, if so, transmit (402) the data packet to all users 401 within that distance. As indicated by the decision step 406, the vehicle 401 (e.g. a controller thereof) may check whether there are any vehicles (or structures) 420 within a distance (e.g. a predetermined distance) of the vehicle 401 and, if so, transmit (406) the data packet to all vehicles (or structures) 420 within that distance. The distances may be the same or different.

On receipt of the data packet the vehicle 420 (or the vehicles/structures within the distance, determined at step 406) may alert their users (e.g. their owners or drivers) 440.

As indicated by the line 403 a vehicle (or structure), e.g. a first vehicle, 401 that is in progress of being attacked or has been attacked may transmit a data packet (comprising the metadata) to one or more of: a central server 430, another vehicle or structure 420, or a user 410 of the (first) vehicle (or structure) 401 or other users 410, as indicated by the respective lines 402, 403 and 404. The respective decision steps (405 and 406) may indicate that a controller of the vehicle 401 firstly determines whether the user(s) or other properties 420 are within a predetermined distance and only transmits the data packet if the user(s) or other properties are within that distance. Alternatively, the decision step may indicate an assessment (or determination) of whether a preference of the user 410 or other property 420 matches part of the metadata and the data packet may be sent when there is a match. Following the line 404 when the data packet is transmitted to a (second) property 420, the data packet may comprise instructions that will cause the second property 420 to send a signal to other users 440 (or to a user 440 of the second property 420) and/or to additional properties 450, which may, in turn send the data packet to further users 455. As indicated by the decision steps 417 and 419, this may be done when the users or other properties are within a predetermined distance and/or when their preferences match part of the metadata.

In examples where the data packet is sent to the server 430, the data packet may comprise instructions that are to cause the server 430 to inform (lines 408, 409) all users 440 or other properties 420, for example those that are within a predetermined distance of the first vehicle/structure (determined at 412 and 413) or those that have a preference matching part of the metadata (determined at 412 and 413).

In this way, the network 400 may be part of a subscription service to which users (410, 440) may subscribe. Therefore, the server 430 may not only forward an alert signal to the owner, driver, and/or operator of the vehicle/structure 401 (which is being attacked) but forward the signal to all subscribers of the service (optionally all subscribers of the service that are within a predetermined distance of the vehicle/structure 401). In one example, subscribers to the service may be notified (e.g. issued an alert comprising the metadata) based on their preferences. For example the preference may include location, vehicle or structure type or business type. In other words, subscribers may wish to be notified of any attacks occurring to the same type of vehicle or structure and/or within a certain distance of their (home or current) location and/or for vehicles or structures being used for the same trade/sector e.g. plumbing or telecoms. The network 400 comprises a database 450 (not explicitly shown connected to the server 430 so as not to complicate FIG. 4) configured to store any data packets (including metadata described thereby) to build up a picture over time of crimes within a certain area and/or to a type of vehicle or structure and/or trade/sector, which may allow users to make informed decisions about (for example) where to park their vehicles or rent premises and/or which areas to drive through/take work in.

The arrows in FIG. 4 are all two-way, meaning that each entity has the ability to share its data not only with the central server 430 but with each other. For example, the 'other' property 420 (in the FIG. 4 example) may be configured to perform the method 100 and share the results with the vehicle/structure 401, server 430, and/or user 440. In other words, each one of the vehicles/structures 401, 420 may have the ability to receive information, determine what sort of attack is taking place or imminent, and then transmit that data packet. In this way all entities operating within the network 400 can communicate with one another to form a better picture of crime-related activity within an area or specific to a type of property/trade/sector As indicated by the arrows 407 and 409, the users may themselves upload information (e.g. data packets) containing metadata describing a type of attack occurring on a vehicle or structure. For example, if a user saw a particular attack being performed on a vehicle (e.g. they witnessed such an attack as they were driving by in their own vehicle or on a train) then they can upload this information to the server 430, which may then be communicated to other users or properties etc. Such information may also include metadata describing at least one of: the outcome of attacks to, suspicious activity at a location (not necessarily related to vehicles), favoured or non-favoured parking areas, location of CCTV cameras etc.

The network 400 may comprise an agency 460, such as a city and/or law enforcement agency with which at least one of a user 410, 440, a vehicle/structure 401, 420, and the server 430 may communicate. In this way, all of the metadata collected may be shared with local law enforcement (e.g. for planning purposes, as such data may indicate a frequency of a certain type of attack in a certain neighbourhood). The agency 460 may have direct access to the database 450. In this way a city and/or a law enforcement agency may have access to 'live' data being uploaded to the server 430 by the properties and/or the users. The data may be anonymised before being shared with the agency 460.

Figure 5:
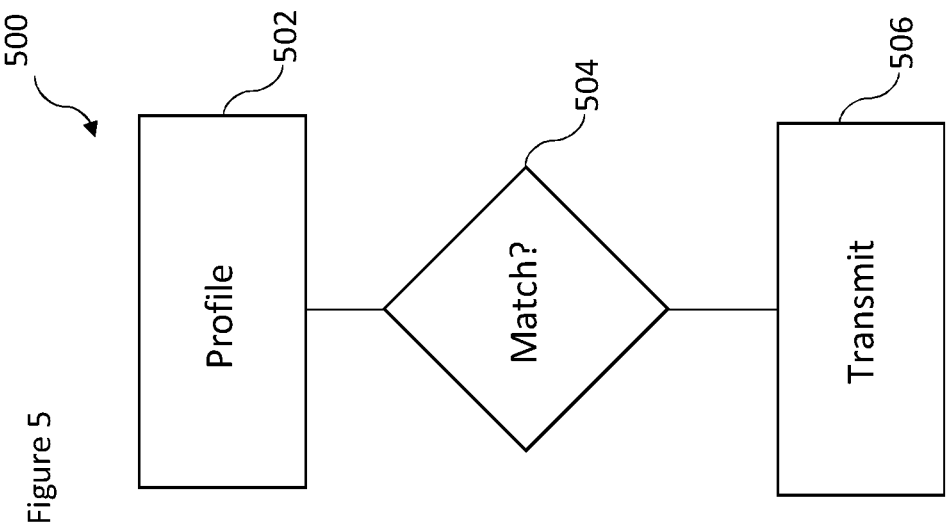
FIG. 5 is a flowchart of an example method that may be used in conjunction with the method of FIG. 1.

FIG. 5 shows an example method that may be used in conjunction with the method 100. For example, after determining at step 104 the type of attack occurring to a vehicle/structure, step 502 of the method 500 retrieves all profiles (e.g. user and/or a property profile) that have subscribed to the service/system. At step 504 the method 500 determines whether there is a match between metadata that describes the attack (e.g. attack type, location, date, time etc.) and one or more user-settable preferences in the user profile. If there is a match then at step 506 comprising step 106, e.g. a data packet comprising that metadata describing at least the attack type is transmitted to the user profile.

By way of example, an attack may be taking place (e.g. to vehicle 401) which, as determined from data from a vibration sensor disposed in the roof of the vehicle 401, may be a person cutting a hole in the roof of the vehicle. The attack may be taking place in a particular street at the current time, say 4 pm. A user 410 may have set their preferences to be notified of all attacks occurring in a postcode containing that street, and another user may have set the preferences of a vehicle 420 profile to be notified of all attacks occurring to their vehicle type. In either case part of the metadata describing the current attack taking place to the vehicle 401 matches both preferences and so a data packet is sent to both the user 410 and the vehicle 420. In either case therefore the user 410 and vehicle 420 are notified that there is an attack taking place and can take further action. In some examples, the receipt of this data packet may automatically trigger the vehicle 420 to take further action (e.g. as discussed above, places itself in a high security mode or drives away etc.).

In one example, the high security mode comprises switching on at least one sensor when the vehicle is parked or switched off. For example, this may be a camera, proximity, or audio sensor. In this way, when a vehicle receives information indicating that an attack is taking place, a number of sensors configured to monitor the vehicle are switched on. In another example the sensor, or sensors, are not left on continuously but cycled on and off, e.g. are switched on for predetermined time intervals.

In another example, the high security mode comprises switching on a set of sensors, each sensor in the set being configured to detect an attack type. For example the set of sensors may comprise at least one of the sensors 210-218 with reference to FIG. 2A to 2E. In this way, although the vehicle is off, a vibration sensor (for example) may be kept on, so that any compromise in integrity in a window or side panel may be detected by this sensor. In another example, the wheel sensor 218 may be kept on, so that the loss of signal from the sensor 218 may still be registered.

Figure 6:
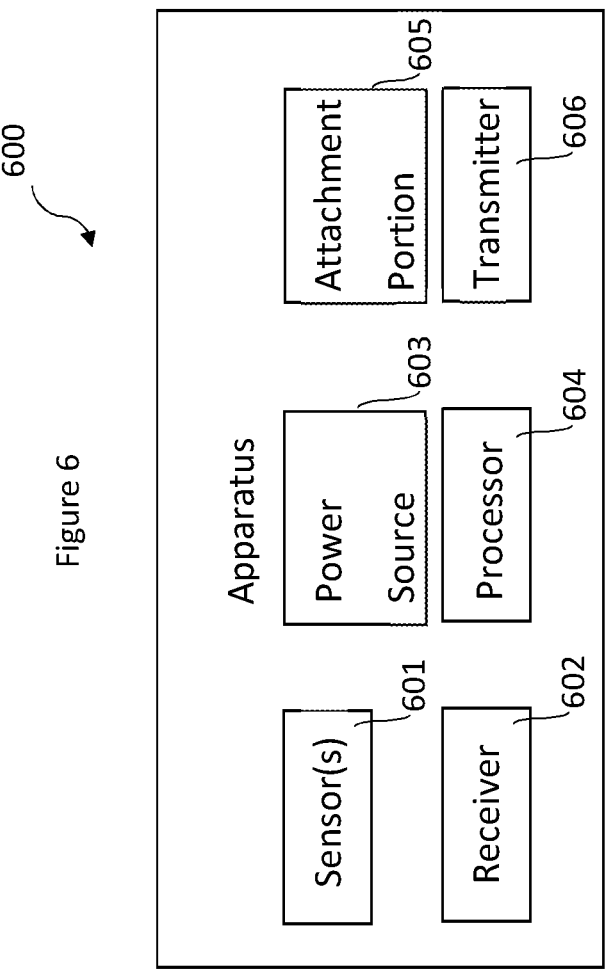
FIG. 6 is an example apparatus which may be used to perform the method of FIGS. 1 and 5.

FIG. 6 shows an apparatus 600 which is configured to perform the method 100 and/or the method 500 as described above. The apparatus 600 comprises a receiver 602, a processor 604, and a transmitter 606. The apparatus 600 may further comprise any of: one or more sensors 601; a power source 603; and an attachment portion 605. The receiver is configured to receive information representing an attack on a vehicle. The information may be received from one or more sensors 601 of the apparatus 600 and/or from other sensors. The processor 604 is configured to determine the attack type that is occurring to the vehicle based on the received information. The transmitter 606 is configured to transmit a data packet to a second receiver (not shown), which may be a second receiver in a central server, a vehicle/structure, or user's smart device etc., the data packet containing metadata that describes the type of attack occurring to the vehicle. Optionally, the metadata may describe the location, day, date, time etc. of the attack. The apparatus may be connected to a power source of a property (such as a vehicle power source or a structure power source), or may comprise a power source 603 (such as a battery, solar cell, generator, and so on). The apparatus may comprise an attachment portion to reversibly attach the apparatus to a vehicle structure. The attachment portion may comprise a magnetic attachment means, an adhesive attachment means, a mechanical attachment means, and so on.

In one example a vehicle or structure may comprise the apparatus 600. For example, a vehicle controller (such as the controller 230 schematically depicted in FIG. 2C) may comprise the apparatus 600.

Figure 7A:
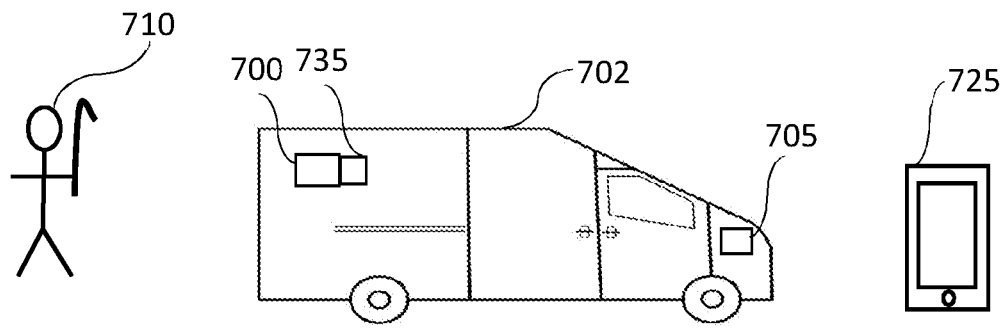
FIGS. 7A to 7C show the stages of an attack on property comprising a vehicle.
Figure 7B:
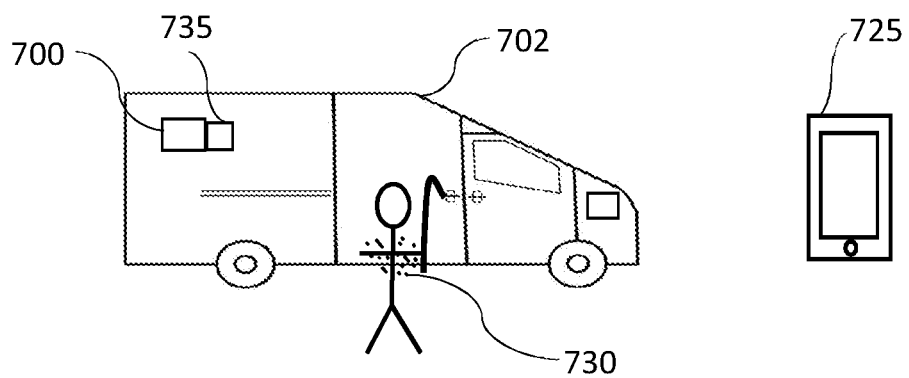
Figure 7C:
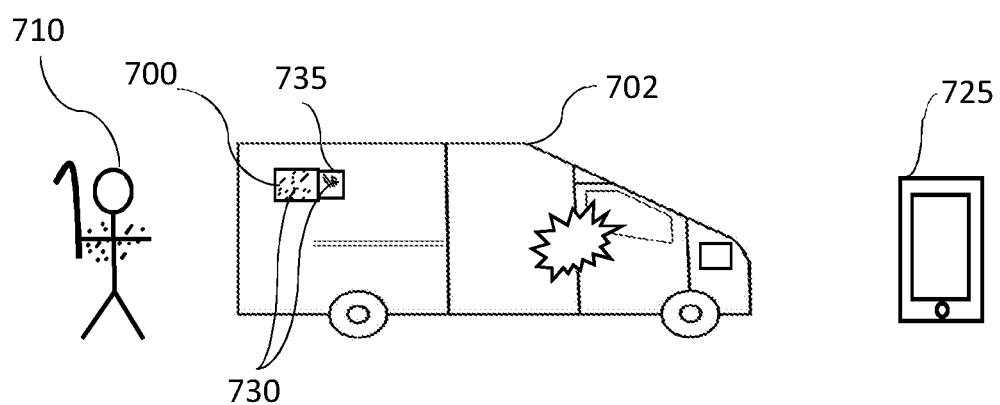

FIGS. 7A to 7C show the stages of an attack on property comprising a vehicle 702. In stage 1, illustrated in FIG. 7A, a likely attack on the vehicle 702 by an attacker 710 is detected by a sensor 705, as described in the preceding arrangements, and the vehicle is then placed in a primed or active state. In this primed or active state, additional sensors (not shown), and a detritus trap 700 may be activated, and information about the attack may also be sent to the vehicle owner, on his mobile device 725 for example, and/or to a law enforcement agency.

In stage 2, illustrated in FIG. 7B the attack on the vehicle begins and as the attacker 710 carries out his attack, the attacker sheds detritus 730 such as particles of skin or clothing fibres.

In stage 3, illustrated in FIG. 7C, the detritus 730 shed by the attacker 710 is captured in the detritus trap 700. In one arrangement, the detritus trap contains a vacuum assembly 735, which in the activated state of the detritus trap 700 draws detritus 730 into the trap.

Figure 8:
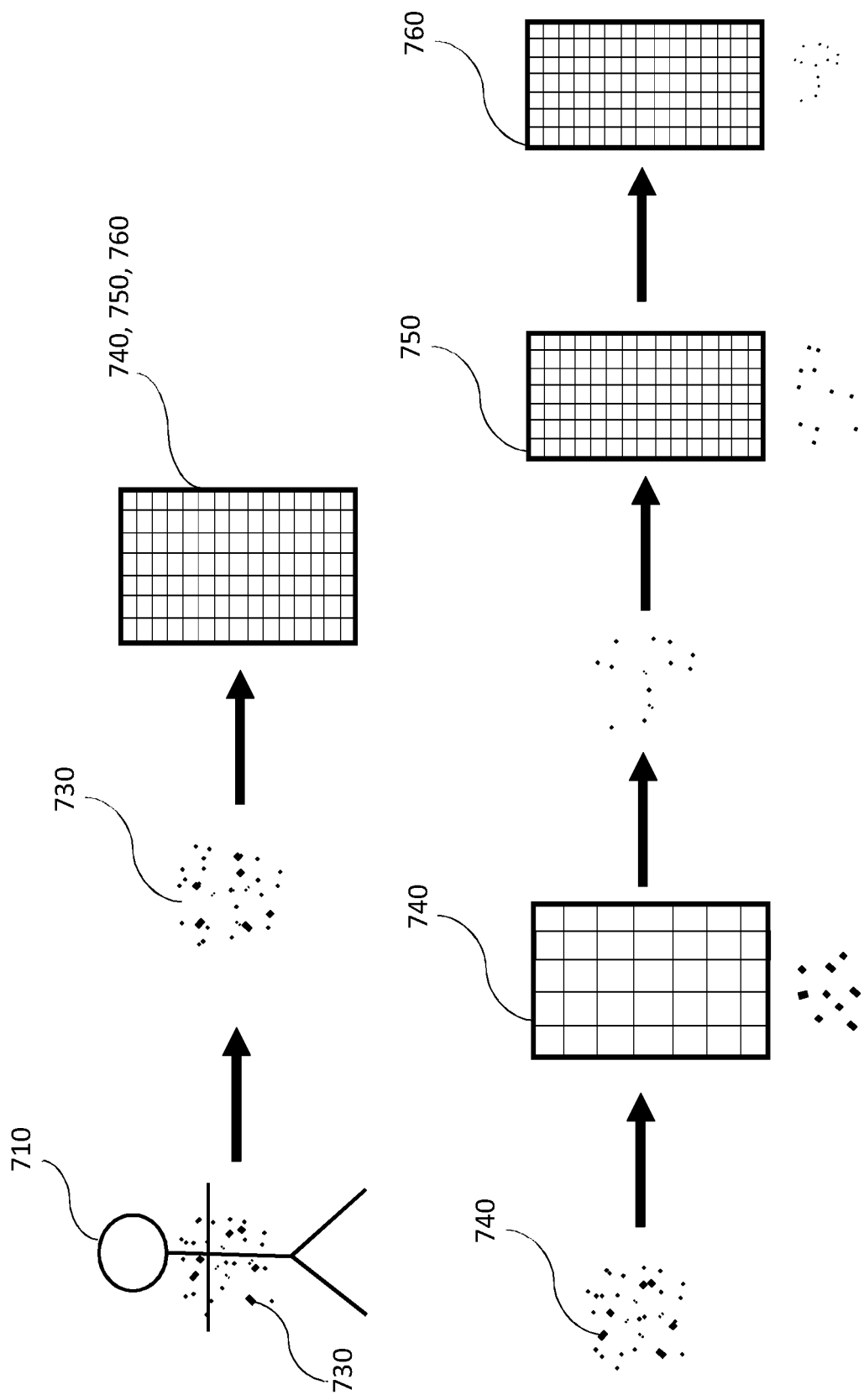
FIG. 8 illustrates the process by which detritus from an attacker is collected during an attack.

FIG. 8 illustrates the process by which the detritus 730 from the attacker 710 is collected. In this process the detritus 730 is drawn through successively finer filters, such as by means of the vacuum assembly 735. The first filter 740 captures larger particles such as clothing fibres and dandruff, the second filter 750 captures finer particles, for example down to around 10 microns in diameter and the third filter 760 captures smaller particles. The third filter 760 may for example capture finer bio samples such as environmental nucleotides from the attacker 710, and may comprise a container with ethanol and preservatives.

After collection the captured detritus 730 may be isolated, sequestered and/or frozen.

The captured detritus 730 may be further processed in new generation DNA sequencers to generate data, such as DNA sequence data which can be stored locally and/or sent to a remote server for analysis to aid identification of attacker 710. The remote server may for example comprise a server at a law enforcement agency.

A 'known signature indicative of a likely attack' is any signature or signal associated with a potential attack on a vehicle, as detected by a sensor of the vehicle or emitted by a potential attacker, when the potential attack on the vehicle has not yet been initiated and/or the attacker is not yet engaged in the act of attacking the vehicle but may be preparing to attack. These signatures are recognisable by detection using at least one sensor of the vehicle. For example, a crowbar in the hand of a potential attacker at a distance from the vehicle may have a number of signatures, one of which may be a certain signature when reflecting radio waves, another of which may be recognised by a camera capable of object recognition.

A 'known attack mode signature' is any signature or signal associated with a mode of attacking a vehicle, as detected by a sensor of the vehicle or emitted by the attacker, when the attack has been initiated and/or the attacker is engaged in the act of attacking the vehicle. These signatures are recognisable by detection using at least one sensor of the vehicle. To continue the example of a crowbar, an accelerometer disposed within the vehicle will be able to detect the motion of the vehicle as the crowbar is wedged into a gap around a door and force applied to the lever. Similarly, audio sensors located within the vehicle or attached to the vehicle bodywork may detect the sounds associated with the crowbar being wedged into the door and the sounds of the vehicle bodywork deforming in response to the forces applied by the crowbar.

A 'known intruder signature' is any signature or signal associated with the presence of an attacker within a vehicle, as detected by a sensor of the vehicle or emitted by the attacker, when the attacker has gained access to the vehicle interior and may be engaged in the act of stealing goods therefrom. These signatures are recognisable by detection using at least one sensor of the vehicle. For example, known intruder signatures may include the detection of body heat within the vehicle when it is known that the rightful occupants of the vehicle are not present and/or access to the vehicle has been achieved by unlawful means, such as those defined by known signatures indicative of a likely attack or known attack mode signatures.

A 'known background signature' is any signature or signal associated with harmless, everyday activity within the environment of a vehicle. These signatures are recognisable by detection using at least one sensor of the vehicle. For example, known background signatures may include the sounds and vibrations caused by a nearby construction site, a rumble of thunder, the vehicle undergoing maintenance or pedestrians passing the vehicle when parked. Known background signatures do not pose a threat to the vehicle.

The known signatures defined above may be acquired by machine learning from prior-programmed knowledge and real world usage by all vehicles using the method and/or system of the present invention. For example, the known signature indicative of a likely attack related to an angle grinder at approximately five metres from a vehicle can be pre-programmed into, for example, a controller. If any vehicles using the method and/or system of the present invention are attacked using an angle grinder, the controller can learn that a signature detected shortly before the attack took place was related to the angle grinder. This knowledge can be distributed to all vehicles using the method of the present invention, such that the signature of an angle grinder can be better recognised in future. Similarly, if a signature is incorrectly classified, such as classified as being innocuous, i.e. a known background signature, but an attack on the vehicle ensues, this incorrect classification can be rectified for future occurrences. This learning process is equally applicable to other forms of vehicle attack, for example, use of a crowbar or a remote hacking attack, as well as other known signatures. In this way, the collective knowledge and accuracy of known signatures increases with use of the method and/or system, and new technologies or methods used by attackers are quickly acquired.

Figure 9:
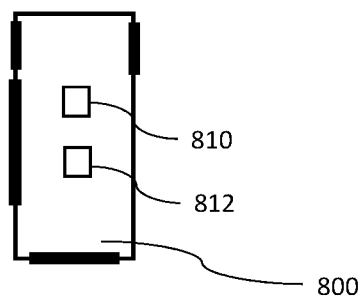
FIG. 9 is a schematic diagram of a vehicle.

FIG. 9 shows a vehicle 800, comprising a controller 812 and a plurality of sensors 810. The controller 812 and sensors 810 may be connected wirelessly or with conventional wired connections. In FIG. 9, the sensors 810 are shown to be fixed within the vehicle interior, however at least one sensor 810 may be on the exterior of the vehicle attached to the vehicle body.

The sensor or sensors 810 may be of any suitable type for detecting objects and/or actions in the environment of a vehicle. The sensors 810 may be dedicated sensors or may perform additional functions such as parking assist. The sensors 810 may comprise sensors of any suitable type, such as an accelerometer, vibration sensor, motion sensor, temperature sensors, door lock sensors, tilt sensors, microphone, audio sensors, wireless signal detectors, GPS devices, cameras having hardware and software to perform facial or object recognition, Lidar, Radar, ANPR, radio frequency detectors, Bluetooth detectors, gyroscopes, passive infrared (PIR), detectors to determine the identity of a mobile device (i.e. mobile phone), or any combination thereof. A plurality of different types of sensor 810 may be provided on the vehicle, and some or all of them may be used in the method and system for vehicle protection.

In use, when the vehicle 800 is unattended, for example when parked, at least one sensor may be configured to run continuously. This sensor may be, for example, a PIR sensor configured to detect motion within the environment of the vehicle. Alternatively, this sensor may be a temperature sensor configured to detect the presence of body heat or the heat of an engine, or further still a wireless signal detector configured to detect the presence of a remote hacking attack on the locking system of vehicle doors.

Figure 13A:
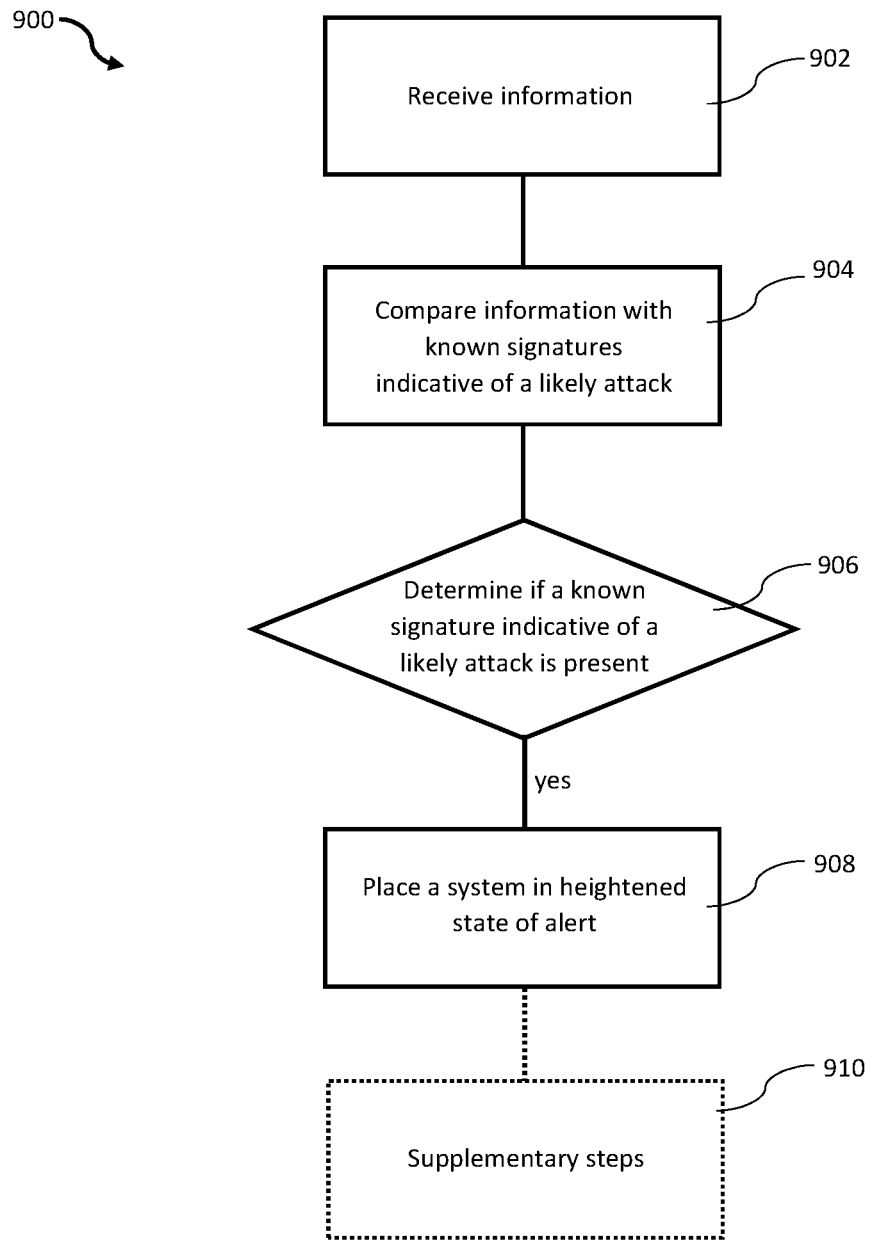
FIGS. 13A to 13C are flow charts representing a method of the present disclosure.
Figure 13B:
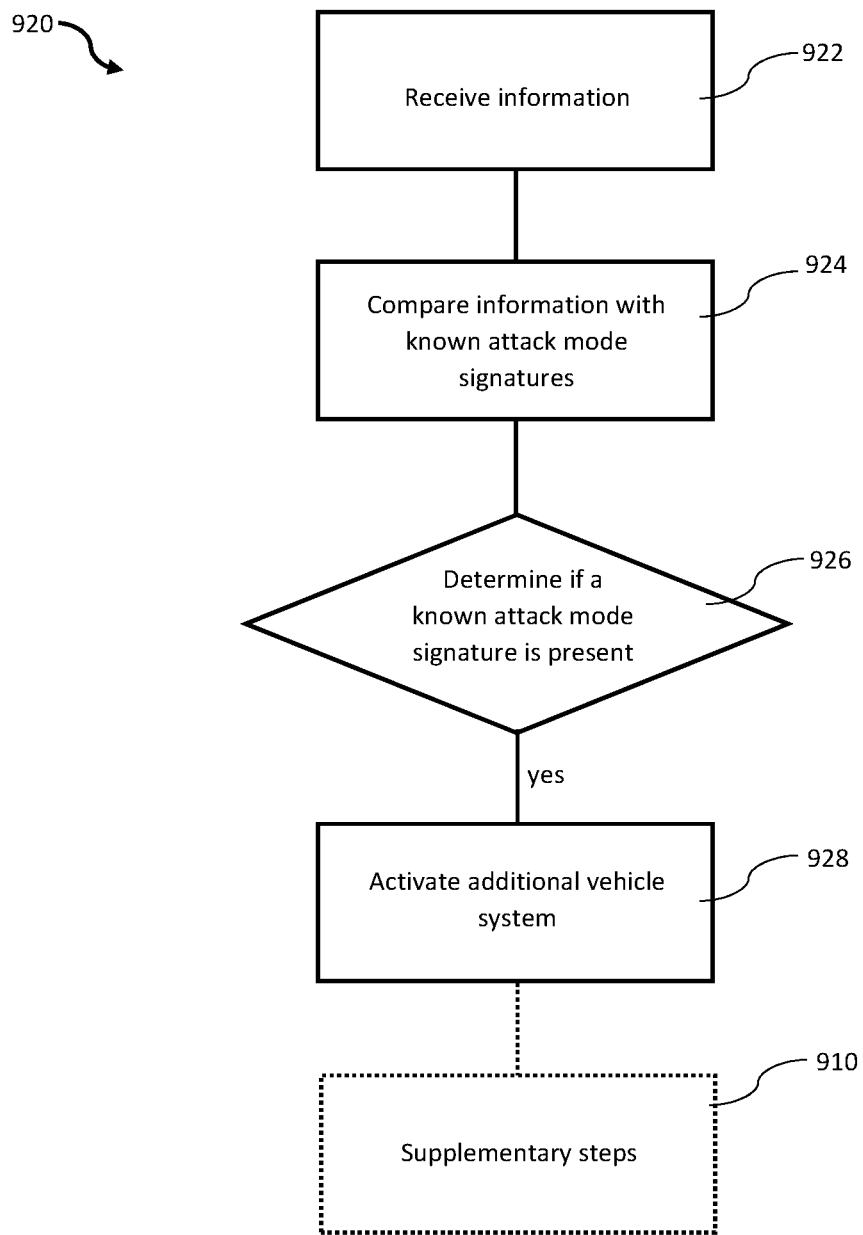
Figure 13C:
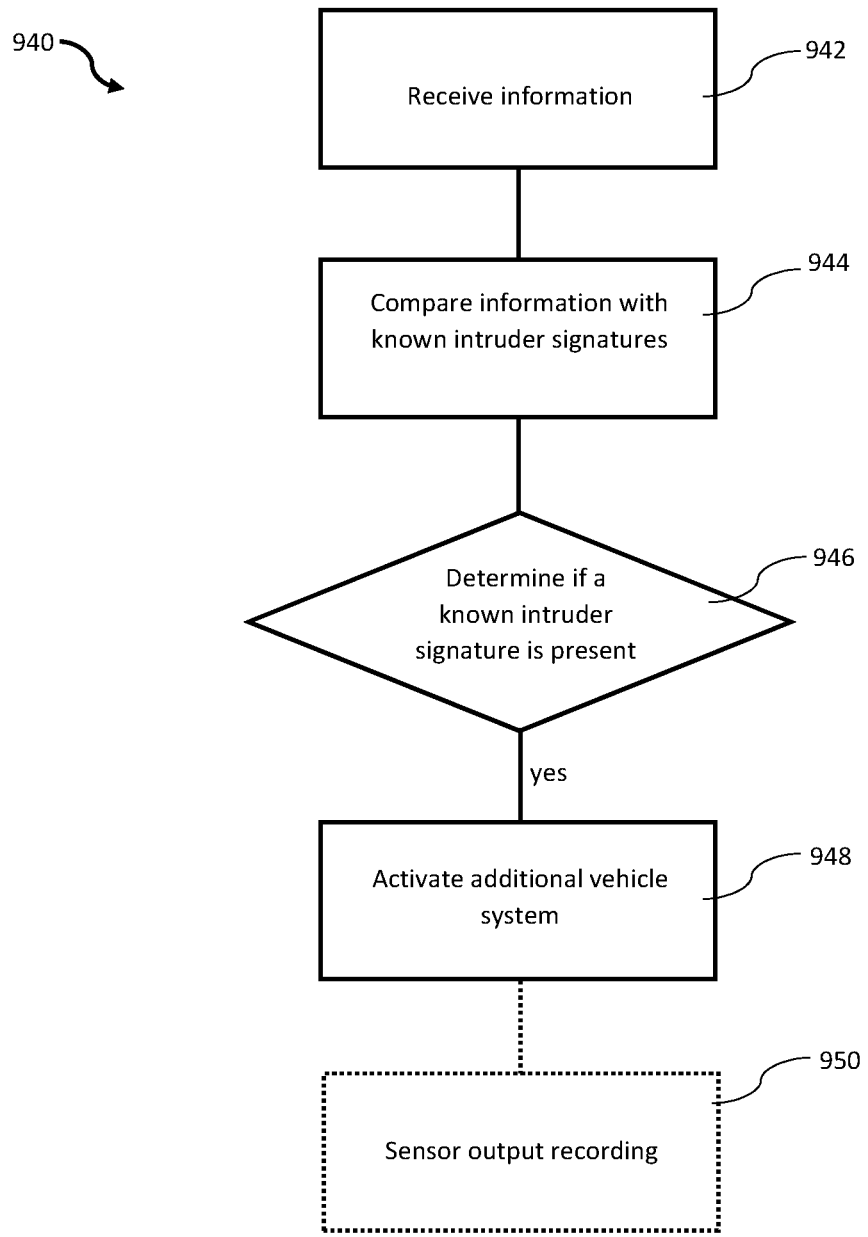

With reference to FIGS. 13A to 13C, the method 900, 920, 940 of the present invention will be described. At step 902, the information gathered by the at least one continuously running sensor is received by a controller 812 housed within the vehicle 800. At step 904 the controller 812 compares the information from the at least one continuously running sensor with known signatures indicative of a likely attack.

Figure 10:
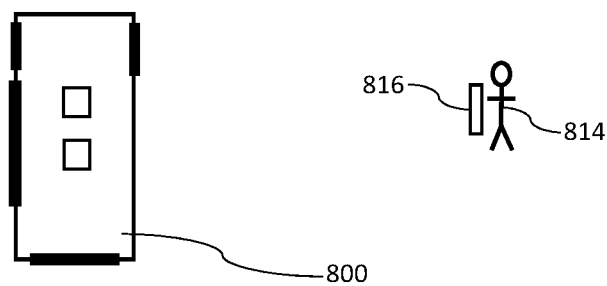
FIG. 10 is a schematic diagram of a person in the environment of a vehicle.

FIG. 10 demonstrates an exemplary scenario in which a person 814 is present within the environment of the vehicle 800. Also present is object 816, which may, for example, comprise a crowbar or pry bar. The person 814 may be in possession of object 816. The at least one continually running sensor gathers information relating to the environment of the vehicle, including person 814 and object 816.

The information gathered by the at least one continuously running sensor is received at step 902 by the controller 812. At step 904, the controller 812 compares the information with known signatures indicative of a likely attack, and determines at step 906 whether a known signature indicative of a likely attack is present. The controller 812 may additionally compare the information with known background signatures in order to eliminate any innocuous signatures gathered by the at least one sensor. In the case of FIG. 10, the presence of a person 814 in possession of an object 816 which has previously been deemed to be capable of effecting entry into the vehicle 800, is determined at step 926 by the controller 812 to be a known signature indicative of a likely attack. Consequently, at step 908, the controller 812 places at least one system of the vehicle 800 into a heightened state of alert.

The placing of the at least one system into a heightened state of alert at step 908 may include: activating at least one further sensor, such as a camera, accelerometer, vibration detector or any other sensor or combination of sensors from the lists above; sending a notification to a location remote from the vehicle; and/or performing steps to further secure the vehicle. The latter may comprise activating any deadlocks if present, cutting fuel supply to the engine or applying additional wheel brakes.

As shown in FIG. 13A, having placed at least one system of the vehicle 800 into a heightened state of alert, the controller 812 may additionally take a number of supplementary steps 910. These steps 910 may include sending a notification to a location remote from the vehicle 800, such as at least one of the mobile phone of the vehicle owner, a local law enforcement organisation, private security company and fleet manager of the vehicle 800. This notification may comprise at least one live sensor output, such as a camera, or a status indication that the vehicle has detected a known signature indicative of a likely attack, including the suspected attack method. Additionally, these supplementary steps 910 may include performing an action to demonstrate to the potential attacker that the vehicle 800 is aware of their actions. This action could be, for example, switching on and/or flashing the vehicle interior and exterior lights, sounding the horn, or emitting a verbal warning signal from a loudspeaker. In autonomous or semi-autonomous vehicles, the vehicle 800 may drive away from the environment.

The method 900 of the present invention is therefore able to foresee that an attack is likely to take place, including the likely means of the attack, before the attack has actually begun. This gives the vehicle 800 a chance to bolster its defenses against such an attack, and if the owner has been notified, gives the owner a chance to themselves determine the situation occurring within the environment of the vehicle 800, and possibly take action themselves, for example by contacting the police. There is also the added benefit that the attack may be prevented with no damage being inflicted upon the vehicle 800 or its contents.

Having placed at least one system of the vehicle 800 into a heightened state of alert at step 908, the controller 812 moves on to method step 920 (FIG. 13B). The controller 812 continues to receive information from the at least one continuously running sensor at step 922. If at least one further sensor was placed in a heightened state of alert, the controller 812 receives information from each activated sensor at step 922. For example, each sensor of the plurality of sensors 810 of the vehicle 800 may now be activated, all gathering information relating to the environment of the vehicle 800, meaning that controller 812 now receives information from each sensor of the plurality of sensors 810.

At step 924, the controller 812 compares the information it receives at step 922 from the at least one sensor with information relating to known attack mode signatures, for example, known attack mode signatures relating to the known signature indicative of a likely attack already determined by the controller 812 at step 926. These attack mode signatures may have been learnt by machine learning in a similar manner to the case of known signatures indicative of a likely attack, as described above. The controller 812 may additionally compare the information with known background signatures in order to eliminate any innocuous signatures gathered by the at least one sensor. The controller 812 then determines whether a known attack mode signature is present at step 926.

Figure 11:
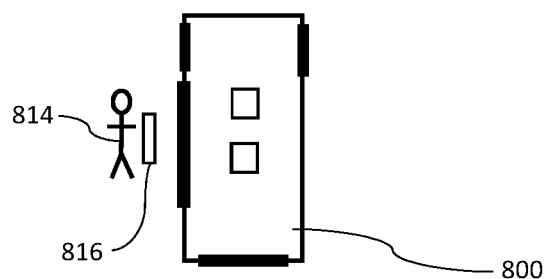
FIG. 11 is a schematic diagram of a person at a vehicle.

In the case of FIG. 11, in which the person 814 in possession of the object 816, the object 816 having been deemed a weapon capable of effecting entry into the vehicle 800, is attempting to gain entry to the vehicle 800 by means of the object 816, the information gathered by the at least one sensor and received by the controller 812 at step 922 relates to the actions taking place upon the vehicle. For example, if an angle grinder were being used by an attacker to effect entry into the interior of the vehicle 800, the vibrations of the attack mode would be detected by a vibration sensor housed in/on the vehicle 800. The information gathered by the vibration sensor would then be received by the controller 812 at step 922 for comparison with known attack mode signatures at step 924.

If the controller 812 determines that a known attack mode signature is present, the controller 812 activates an additional vehicle system at step 928 and configures it to counter the attack having the known attack mode signature. For example, if a hacking attack is detected, the controller 812 may activate a vehicle system configured to counter-hack the system used by the attacker. As another example, if the vehicle 800 is being attacked in person, such as by means of a crowbar, the controller 812 may activate strobe lights, configured to debilitate the attacker, at step 928. Having determined the presence of a known attack mode, it is now known that an attack is taking place on the vehicle 800.

At this stage, the controller 812 may additionally take a number of supplementary steps 910 as disclosed previously. These steps may include sending of a notification to a location remote from the vehicle 800, and/or an action to demonstrate that the vehicle 800 is aware of the actions of the attacker. As the vehicle has now determined that an attack is actually taking place, and not that it is just likely, the supplementary steps 910 taken by the controller 812 may be more definite in their nature. For example, the vehicle 800 may continuously sound its horn, flash its lights and emit loud verbal warnings to the attacker. The controller 812 may activate further sensors disposed within the vehicle. In autonomous or semi-autonomous vehicles, the vehicle 800 may drive away from the environment.

After determining the presence of a known attack mode, and activating an additional vehicle system at step 928, the controller 812 may move on to method step 940 (FIG. 13C).

Figure 12:
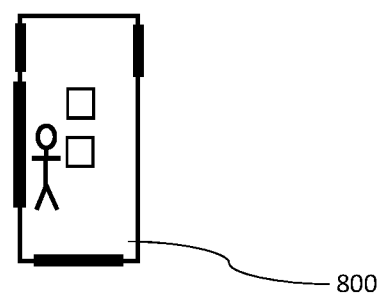
FIG. 12 is a schematic diagram of a person in a vehicle.

The controller 812 continues to receive information from the at least one sensor, comparing the information at step 944 with known intruder signatures learnt by machine learning, as described above. The controller 812 may additionally compare the information with known background signatures in order to eliminate any innocuous signatures gathered by the at least one sensor. In, for example, the scenario of FIG. 12, where a person 814 has gained unlawful access to the interior of the vehicle 800, a thermal sensor within the vehicle 800 gathers information relating to the thermal conditions of the vehicle interior. This information is received by the controller 812 at step 942, and then compared with known intruder signatures at step 944. If it is determined by the controller 812, based on the information received, that a known intruder signature is present, the controller 812 activates an additional vehicle system at step 948 to repel, scare off or deter the intruder from continuing their activities. This may take the form of a strobe light, a staining identifying fluid that can be sprayed on the intruder, or if autonomous or semi-autonomous, the vehicle 800 may begin to drive away from the environment.

At each stage of determining the presence of a known signature at steps 906, 926, 946, be it known signatures indicative of a likely attack, known attack mode signatures or known intruder signatures, the controller 812 may time-out after a certain duration of inactivity or return to a previous step. For example, if a known signature indicative of a likely attack is determined to be present at step 906, the additional vehicle system will remain in a heightened state of alert so for a certain length of time, such as five minutes. If after this length of time the method has not progressed to the next stage as no further determinations of known signatures have been made by the controller 812, then the system in a heightened state of alert will return to step 902 of method 900 in order to preserve vehicle battery life.

Once it is determined that an attack is taking place, or that an intruder is within the vehicle 800, the controller 812 may begin recording the outputs of a number of sensors at step 950 to improve the chances of apprehending the attackers. These recorded outputs may be stored on a storage device. These recorded outputs may be of any suitable type, for example relating to gait analysis, facial recognition, voice recording of speech between attackers, video recording of the vehicle, ANPR, scanning of the local environment to identify electronic devices (e.g. mobile phones and nearby vehicles) present at the time of the attack. The latter may be performed by pinging nearby devices and recording their identities, such as Bluetooth identities. As Bluetooth has a relatively low effective range, any devices being detectable by Bluetooth can be known to have been within approximately ten metres of the vehicle at the time of the attack. Similarly, vehicle attacks are often carried out using other vehicles, so any vehicles detected nearby at the time of the attack, for example using ANPR, can be identified.

At least one recorded sensor output may be sent to a device remote from the vehicle such as a law enforcement computer. The recorded sensor outputs could be correlated with other vehicle attacks to identify any attackers responsible for multiple vehicle attacks. This information could then be used by law enforcement to improve the chances of apprehending and convicting the attackers.

It is possible that the signature of an individual attacker, including their unique mannerisms and characteristics, can be learnt. This may be particularly useful if the present method were additionally used for protection outside the realm of vehicles, for example in home or shop security systems.

The method of the present disclosure is therefore a means of vehicle protection that acts pre-emptively before a vehicle attack, counteractively and proactively during a vehicle attack, and advantageously after a vehicle attack.

Figure 14:
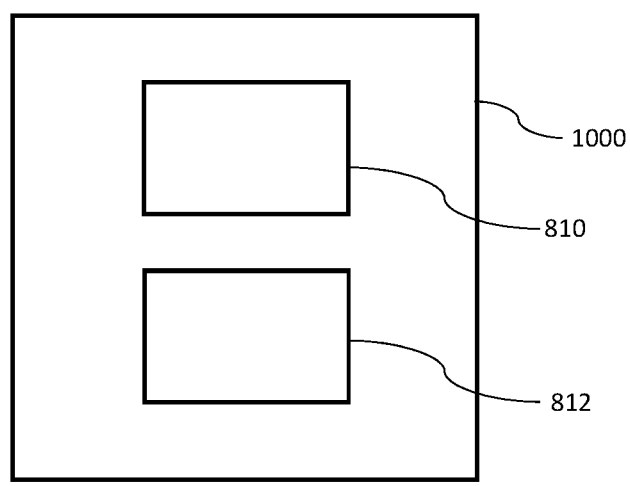
FIG. 14 is a schematic diagram of a system of the present disclosure.

With reference to FIG. 14, a system 1000 comprises the plurality of sensors 810 configured to gather information relating to the environment of the vehicle 800, and the controller 812 configured to be in communication with the plurality of sensors 810. The system 1000 may additionally comprise a strobe light, a loudspeaker, a horn and a storage device (not shown). The system 1000 is configurable to carry out the method 900, 920, 940 of the present invention.

The system and method of the present invention may have additional applications beyond attack protection.

In particular vehicles, it is common that multiple people will need to access the vehicle over a period of time. Often, only the driver of a vehicle will have a set of keys, meaning in these circumstances, vehicles may be left unlocked to avoid the inconvenience of different people needing the keys to lock and unlock the vehicle.

The system and method of the present invention is able to circumvent these problems, by the use of non-contact and/or remote authorisation of a new person, not known to the vehicle. A driver may be able to remotely allow access to the vehicle, for example, whether by temporarily disabling the system using an app on a mobile device, or by unlocking at least one vehicle door. Additionally, it is possible that the van permits entry to a number of authorised people. These authorised people may become known to the system by virtue of their phone identity (e.g. the driver may record the Bluetooth signature of each authorised person's phone, or the system could learn their phone identity by virtue of having previously been present in the vehicle). Alternatively the unique characteristics and/or mannerisms of each person could be acquired by the system of the present invention, by means of the plurality of sensors 810, to create a known signature for each authorised person. Any of these signatures associated with an authorised person with permission to access the vehicle is termed a known signature of an authorised person.

In this way, when a person approaches the vehicle legitimately needing access, the person is permitted access without needing to use keys or operate an unlocking device. The ability of the system to permit access to a vehicle for people legitimately needing to gain entry is termed 'Delegate Entry'.

Delegate Entry may be particularly useful, for example, in commercial vehicles used by multiple tradesmen and tradeswomen, when loading and unloading is taking place, or when accessing equipment stored therein. When a person approaches a van carrying tools, the system and method of the present invention will recognise that the person is authorised by the driver, and that the tools do not pose a threat to the vehicle. The vehicle may then unlock at least one door of the vehicle such that access is allowed.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

While the present disclosure has been illustrated and described in detail in the drawings and foregoing description, such illustration and description are to be considered illustrative or exemplary and not restrictive; the invention is not limited to the disclosed embodiments. Various alternative examples are discussed through the detailed description. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

That which is claimed is:

1. A method for protecting property, the method comprising:
    receiving information indicating an attack on the property, wherein the property is a vehicle;
    determining, from the received information, a type of attack upon the property indicated by the received information;
    determining whether a match exists between metadata describing the determined type of attack and a user preference;
    transmitting, responsive to the determination that the match exists between the metadata and the user preference, a data packet to a receiver, the data packet comprising the metadata; and
    performing, at the property, an action to demonstrate awareness of the attack to an attacker associated with the attack;
    determining that there are users and/or properties within a first distance of the location of the indicated attack, wherein the first distance comprises a user-settable distance or a postcode-based distance;
    determining that at least one user-settable preference of a user and/or further vehicle matches at least part of the metadata described by the data packet;
    transmitting, based on the determination that there are users and/or properties within the first distance, an alert signal to the users and/or properties within the first distance; and
    causing, by a controller of the vehicle, the vehicle to change location under autonomous control.

2. The method of claim 1 wherein the receiver is in a second vehicle.

3. The method of claim 2 wherein the data packet comprises instructions that, when executed by a controller of the second vehicle, cause the controller to send an alert signal to a user of the second vehicle, wherein the alert signal comprises the metadata of the data packet.

4. The method of claim 2 wherein the data packet comprises instructions that, when executed by a controller in the second vehicle, cause the controller to do at least one of:
    transmit the data packet to another vehicle;
    transmit the data packet to another user;
    cause the second vehicle to enter a high security mode;
    alert all users and/or vehicles in a predetermined radius or distance of the location of the vehicle;
    alert a local authority; and
    store at least a portion of the metadata from the data packet in a database.

5. The method of claim 1, further comprising:
    determining, if there are any users or vehicles within a second distance of the location of the second or further vehicle and, if there are, then
    determining if at least one user-settable preference of a user and/or further vehicle matches at least part of the metadata described by the data packet and, if so, transmitting an alert signal to those users and/or vehicles.

6. The method of claim 1 wherein a central server comprises the receiver.

7. The method of claim 6 wherein the data packet comprises instructions that, when executed by the central server, cause the central server to transmit an alert to one or more users and/or properties.

8. The method of claim 6 further comprising:
    transmitting at least a portion of the metadata from the receiver to one or more users and/or properties.

9. The method of claim 7 wherein the alert signal comprises instructions that, when received by a receiver in a vehicle and executed by a controller in the vehicle, cause the controller to do at least one of:
    transmit the data packet to another vehicle;
    transmit the data packet to another user;
    cause the vehicle to enter a high security mode;
    alert all users and/or vehicles in a predetermined radius or distance of the vehicle's location;
    alert a local authority; and
    store at least a portion of the metadata from the data packet in a database.

10. The method of claim 1 wherein the metadata describes at least one of: the time of the attack, the day of the attack, the date of the attack, and the location of the attack.

11. An apparatus for protecting property comprising:
    a first receiver configured to receive information indicating an attack on the property, wherein the property is a vehicle;
    a processor configured to:
        determine, from the received information, a type of attack indicated by the received information and to determine whether a match exists between metadata describing the determined type of attack and a user preference;
        determine that there are users and/or properties within a first distance of the location of the indicated attack, wherein the first distance comprises a user-settable distance or a postcode-based distance; and
        determine that at least one user-settable preference of a user and/or further vehicle matches at least part of the metadata described by the data packet;
    a transmitter configured to:
        transmit, responsive to the determination that the match exists between the metadata and the user preference, a data packet to a second receiver, the data packet comprising the metadata; and
        transmit, based on the determination that there are users and/or properties within the first distance, an alert signal to the users and/or properties within the first distance; and
    a controller configured to:
        perform, at the property, an action to demonstrate awareness of the attack to an attacker associated with the attack; and
        cause the vehicle to change location under autonomous control.

12. The apparatus of claim 11, further comprising one or more sensors configured to detect information indicating an attack on the property, and to send the detected information to the first receiver.

13. The apparatus of claim 11, further comprising an attachment portion configured to reversibly attach the apparatus on to or in to the property.

14. The apparatus of claim 11 wherein the controller is further configured to cause a vehicle comprising the second receiver to change location under autonomous control.

15. The apparatus of claim 11, wherein the processor is further configured to determine if there are any users and/or properties within a second distance of the location of the indicated attack, wherein the second distance comprises a user-settable distance or a postcode-based distance, and, if it is determined that there is at least one user or property within the second distance, then the processor is further configured to transmit an alert signal to the users and/or properties within the second distance.

* * * * *